(12) United States Patent
Liu et al.

(10) Patent No.: US 9,746,643 B2
(45) Date of Patent: Aug. 29, 2017

(54) OPTICAL IMAGE CAPTURING SYSTEM

(71) Applicant: ABILITY OPTO-ELECTRONICS TECHNOLOGY CO., LTD., Taichung (TW)

(72) Inventors: Yao-Wei Liu, Taichung (TW); Nai-Yuan Tang, Taichung (TW); Yeong-Ming Chang, Taichung (TW)

(73) Assignee: ABILITY OPTO-ELECTRONICS TECHNOLOGY CO., LTD., Taichung (TW)

( * ) Notice: Subject to any disclaimer, the term of this patent is extended or adjusted under 35 U.S.C. 154(b) by 0 days.

(21) Appl. No.: 15/070,956

(22) Filed: Mar. 15, 2016

(65) Prior Publication Data

US 2016/0356991 A1 Dec. 8, 2016

(30) Foreign Application Priority Data

Jun. 5, 2015 (TW) .............................. 104118407 A

(51) Int. Cl.
| | |
|---|---|
| *G02B 11/30* | (2006.01) |
| *G02B 13/00* | (2006.01) |
| *G02B 9/60* | (2006.01) |
| *G02B 27/64* | (2006.01) |

(52) U.S. Cl.
CPC .......... *G02B 13/0045* (2013.01); *G02B 9/60* (2013.01); *G02B 27/646* (2013.01)

(58) Field of Classification Search
CPC .............................. G02B 13/0045; G02B 9/60
See application file for complete search history.

(56) References Cited

U.S. PATENT DOCUMENTS

2014/0293453 A1  10/2014  Ogino et al.

FOREIGN PATENT DOCUMENTS

| TW | 201435384 A | 9/2014 |
|---|---|---|
| TW | 201520592 A | 6/2015 |
| TW | I553340 B | 10/2016 |
| TW | 201641983 A | 12/2016 |
| WO | 2014080382 A1 | 5/2014 |

OTHER PUBLICATIONS

U.S. Appl. No. 15/070,956, Liu et al. filed Mar. 2016.*
Examination Report for TW104118407, Completed Dec. 22, 2016, Total of 10 pages.
Search Report for TW104118407, Completed Dec. 5, 2016, Total of 1 page.

* cited by examiner

*Primary Examiner* — Joseph P Martinez
(74) *Attorney, Agent, or Firm* — Lynette Wylie; Apex Juris, PLLC.

(57) ABSTRACT

An optical image capturing system includes, along the optical axis in order from an object side to an image side, a first lens, a second lens, a third lens, a fourth lens, and a fifth lens. At least one lens among the first to the fifth lenses has positive refractive force, wherein the fifth lens can have negative refractive force, wherein both surfaces thereof are aspheric, and at least one surface thereof has an inflection point and wherein the first to the fifth lenses in the optical image capturing system have refractive power whereby the optical image capturing system can increase aperture value and improve the imaging quality for use in compact cameras.

22 Claims, 18 Drawing Sheets

OPTICAL IMAGE CAPTURING SYSTEM

BACKGROUND OF THE INVENTION

1. Technical Field

The present invention relates generally to an optical system, and more particularly to a compact optical image capturing system for an electronic device.

2. Description of Related Art

In recent years, with the rise of portable electronic devices having camera functionalities, the demand for an optical image capturing system is raised gradually. The image sensing device of the ordinary photographing camera is commonly selected from charge coupled device (CCD) or complementary metal-oxide semiconductor sensor (CMOS Sensor). In addition, as advanced semiconductor manufacturing technology enables the minimization of the pixel size of the image sensing device, the development of the optical image capturing system towards the field of high pixels. Therefore, the requirement for high imaging quality is rapidly raised.

The conventional optical system of the portable electronic device usually has three or four lenses. However, the optical system is asked to take pictures in a dark environment, in other words, the optical system is asked to have a large aperture. The conventional optical system provides high optical performance as required.

It is an important issue to increase the quantity of light entering the lens. In addition, the modern lens is also asked to have several characters, including high image quality.

BRIEF SUMMARY OF THE INVENTION

The aspect of embodiment of the present disclosure directs to an optical image capturing system and an optical image capturing lens which use combination of refractive powers, convex and concave surfaces of five-piece optical lenses (the convex or concave surface in the disclosure denotes the geometrical shape of an image-side surface or an object-side surface of each lens on an optical axis) to increase the quantity of incoming light of the optical image capturing system, and to improve imaging quality for image formation, so as to be applied to minimized electronic products.

The term and its definition to the lens parameter in the embodiment of the present are shown as below for further reference.

The lens parameter related to a length or a height in the lens:

A height for image formation of the optical image capturing system is denoted by HOI. A height of the optical image capturing system is denoted by HOS. A distance from the object-side surface of the first lens to the image-side surface of the fifth lens is denoted by InTL. A distance from the first lens to the second lens is denoted by IN12 (instance). A central thickness of the first lens of the optical image capturing system on the optical axis is denoted by TP1 (instance).

The lens parameter related to a material in the lens:

An Abbe number of the first lens in the optical image capturing system is denoted by NA1 (instance). A refractive index of the first lens is denoted by Nd1 (instance).

The lens parameter related to a view angle in the lens:

A view angle is denoted by AF. Half of the view angle is denoted by HAF. A major light angle is denoted by MRA.

The lens parameter related to exit/entrance pupil in the lens:

An entrance pupil diameter of the optical image capturing system is denoted by HEP. For any surface of any lens, a maximum effective half diameter (EHD) is a perpendicular distance between an optical axis and a crossing point on the surface where the incident light with a maximum viewing angle of the system passing the very edge of the entrance pupil. For example, the maximum effective half diameter of the object-side surface of the first lens is denoted by EHD11, the maximum effective half diameter of the image-side surface of the first lens is denoted by EHD12, the maximum effective half diameter of the object-side surface of the second lens is denoted by EHD21, the maximum effective half diameter of the image-side surface of the second lens is denoted by EHD22, and so on.

The lens parameter related to a depth of the lens shape:

A distance in parallel with the optical axis from a point where the optical axis passes through to an end point of the maximum effective semi diameter on the object-side surface of the fifth lens is denoted by InRS51 (the depth of the maximum effective semi diameter). A distance in parallel with the optical axis from a point where the optical axis passes through to an end point of the maximum effective semi diameter on the image-side surface of the fifth lens is denoted by InRS52 (the depth of the maximum effective semi diameter). The depth of the maximum effective semi diameter (sinkage) on the object-side surface or the image-side surface of any other lens is denoted in the same manner.

The lens parameter related to the lens shape:

A critical point C is a tangent point on a surface of a specific lens, and the tangent point is tangent to a plane perpendicular to the optical axis and the tangent point cannot be a crossover point on the optical axis. To follow the past, a distance perpendicular to the optical axis between a critical point C41 on the object-side surface of the fourth lens and the optical axis is HVT41 (instance), and a distance perpendicular to the optical axis between a critical point C42 on the image-side surface of the fourth lens and the optical axis is HVT42 (instance). A distance perpendicular to the optical axis between a critical point C51 on the object-side surface of the fifth lens and the optical axis is HVT51 (instance), and a distance perpendicular to the optical axis between a critical point C52 on the image-side surface of the fifth lens and the optical axis is HVT52 (instance). A distance perpendicular to the optical axis between a critical point on the object-side or image-side surface of other lenses the optical axis is denoted in the same manner.

The object-side surface of the fifth lens has one inflection point IF511 which is nearest to the optical axis, and the sinkage value of the inflection point IF511 is denoted by SGI511 (instance). A distance perpendicular to the optical axis between the inflection point IF511 and the optical axis is HIF511 (instance). The image-side surface of the fifth lens has one inflection point IF521 which is nearest to the optical axis, and the sinkage value of the inflection point IF521 is denoted by SGI521 (instance). A distance perpendicular to the optical axis between the inflection point IF521 and the optical axis is HIF521 (instance).

The object-side surface of the fifth lens has one inflection point IF512 which is the second nearest to the optical axis, and the sinkage value of the inflection point IF512 is denoted by SGI512 (instance). A distance perpendicular to the optical axis between the inflection point IF512 and the optical axis is HIF512 (instance). The image-side surface of the fifth lens has one inflection point IF522 which is the second nearest to the optical axis, and the sinkage value of the inflection point IF522 is denoted by SGI522 (instance). A distance perpendicular to the optical axis between the inflection point IF522 and the optical axis is HIF522 (instance).

The object-side surface of the fifth lens has one inflection point IF513 which is the third nearest to the optical axis, and the sinkage value of the inflection point IF513 is denoted by SGI513 (instance). A distance perpendicular to the optical axis between the inflection point IF513 and the optical axis is HIF513 (instance). The image-side surface of the fifth lens has one inflection point IF523 which is the third nearest to the optical axis, and the sinkage value of the inflection point IF523 is denoted by SGI523 (instance). A distance perpendicular to the optical axis between the inflection point IF523 and the optical axis is HIF523 (instance).

The object-side surface of the fifth lens has one inflection point IF514 which is the fourth nearest to the optical axis, and the sinkage value of the inflection point IF514 is denoted by SGI514 (instance). A distance perpendicular to the optical axis between the inflection point IF514 and the optical axis is HIF514 (instance). The image-side surface of the fifth lens has one inflection point IF524 which is the fourth nearest to the optical axis, and the sinkage value of the inflection point IF524 is denoted by SGI524 (instance). A distance perpendicular to the optical axis between the inflection point IF524 and the optical axis is HIF524 (instance).

An inflection point, a distance perpendicular to the optical axis between the inflection point and the optical axis, and a sinkage value thereof on the object-side surface or image-side surface of other lenses is denoted in the same manner.

The lens parameter related to an aberration:

Optical distortion for image formation in the optical image capturing system is denoted by ODT. TV distortion for image formation in the optical image capturing system is denoted by TDT. Further, the range of the aberration offset for the view of image formation may be limited to 50%-100% field. An offset of the spherical aberration is denoted by DFS. An offset of the coma aberration is denoted by DFC.

A modulation transfer function (MTF) graph of an optical image capturing system is used to test and evaluate the contrast and sharpness of the generated images. The vertical axis of the coordinate system of the MTF graph represents the contrast transfer rate, of which the value is between 0 and 1, and the horizontal axis of the coordinate system represents the spatial frequency, of which the unit is cycles/mm or lp/mm, i.e., line pairs per millimeter. Theoretically, a perfect optical image capturing system can present all detailed contrast and every line of an object in an image. However, the contrast transfer rate of a practical optical image capturing system along a vertical axis thereof would be less than 1. In addition, peripheral areas in an image would have poorer realistic effect than a center area thereof has. The values of MTF in a quarter of the spatial frequency at the optical axis, 0.3 field of view, and 0.7 field of view on an image plane are respectively denoted by MTFQ0, MTFQ3, and MTFQ7; the values of MTF in half of the spatial frequency (half frequency) at the optical axis, 0.3 field of view, and 0.7 field of view on an image plane are respectively denoted by MTFH0, MTFH3, and MTFH7; the values of MTF in full frequency at the optical axis, 0.3 field of view, and 0.7 field of view on the image plane are respectively denoted by MTF0, MTF3, and MTF7. The three aforementioned fields of view respectively represent the center, the inner field of view, and the outer field of view of a lens, and, therefore, can be used to evaluate the performance of an optical image capturing system. The optical image capturing system provided in the present invention mainly corresponds to photosensitive components which provide pixels having a size no large than 1.12 micrometer, and, therefore, a quarter of the spatial frequency, a half of the spatial frequency (half frequency), and the full spatial frequency (full frequency) of the MTF diagram are respectively at least 110 cycles/mm, 220 cycles/mm and 440 cycles/mm.

The present invention provides an optical image capturing system, in which the fifth lens is provided with an inflection point at the object-side surface or at the image-side surface to adjust the incident angle of each view field and modify the ODT and the TDT. In addition, the surfaces of the fifth lens are capable of modifying the optical path to improve the imaging quality.

The optical image capturing system of the present invention includes a first lens, a second lens, a third lens, a fourth lens, a fifth lens, and an image plane in order along an optical axis from an object side to an image side. The first lens has refractive power. Both the object-side surface and the image-side surface of the fifth lens are aspheric surfaces. The optical image capturing system satisfies:

$$1.2 \leq f/HEP \leq 6.0; 0.5 \leq HOS/f \leq 3 \text{ and } 0.5 \leq SETP/STP<1;$$

where f is a focal length of the optical image capturing system; HEP is an entrance pupil diameter of the optical image capturing system; HOS is a distance in parallel with the optical axis between an object-side surface, which face the object side, of the first lens and the image plane; ETP1, ETP2, ETP3, ETP4, and ETP5 are respectively a thickness in parallel with the optical axis at a height of ½ HEP of the first lens to the fifth lens, wherein SETP is a sum of the aforementioned ETP1 to ETP5; TP1, TP2, TP3, TP4, and TP5 are respectively a thickness at the optical axis of the first lens to the fifth lens, wherein STP is a sum of the aforementioned TP1 to TP5.

The present invention further provides an optical image capturing system, including a first lens, a second lens, a third lens, a fourth lens, a fifth lens, and an image plane in order along an optical axis from an object side to an image side. The first lens has positive refractive power, wherein the object-side surface thereof can be convex near the optical axis. The second lens has refractive power. The third lens has refractive power. The fourth lens has positive refractive power. The fifth lens has refractive power, and both the object-side surface and the image-side surface thereof are aspheric surfaces. At least two lenses among the first lens to the fifth lens respectively have at least an inflection point on at least a surface thereof. At least one lens between the second lens and the fifth lens has positive refractive power. The optical image capturing system satisfies:

$$1.2 \leq f/HEP \leq 6.0; 0.5 \leq HOS/f \leq 3.0; 0.2 \leq EIN/ETL<1;$$

where f is a focal length of the optical image capturing system; HEP is an entrance pupil diameter of the optical image capturing system; HOS is a distance in parallel with the optical axis between an object-side surface, which face the object side, of the first lens and the image plane; ETL is a distance in parallel with the optical axis between a coordinate point at a height of ½ HEP on the object-side surface of the first lens and the image plane; EIN is a distance in parallel with the optical axis between the coordinate point at the height of ½ HEP on the object-side surface of the first lens and a coordinate point at a height of ½ HEP on the image-side surface of the fifth lens.

The present invention further provides an optical image capturing system, including a first lens, a second lens, a third lens, a fourth lens, a fifth lens, and an image plane, in order along an optical axis from an object side to an image side. The number of the lenses having refractive power in the optical image capturing system is five. At least two lenses among the first to the fifth lenses have at least an inflection point on at least one surface thereof. The first lens has positive refractive power, and the second lens has positive refractive power. The third lens has refractive power. The fourth lens has positive refractive power. The fifth lens has refractive power, wherein the object-side surface and the image-side surface thereof are both aspheric surfaces. The optical image capturing system satisfies:

$$1.2 \leq f/HEP \leq 3.0; 0.5 \leq HOS/f \leq 3.0; 0.2 \leq EIN/ETL < 1;$$

where f is a focal length of the optical image capturing system; HEP is an entrance pupil diameter of the optical image capturing system; HOS is a distance in parallel with the optical axis between an object-side surface, which face the object side, of the first lens and the image plane; ETL is a distance in parallel with the optical axis between a coordinate point at a height of ½ HEP on the object-side surface of the first lens and the image plane; EIN is a distance in parallel with the optical axis between the coordinate point at the height of ½ HEP on the object-side surface of the first lens and a coordinate point at a height of ½ HEP on the image-side surface of the fifth lens.

For any lens, the thickness at the height of a half of the entrance pupil diameter (HEP) particularly affects the ability of correcting aberration and differences between optical paths of light in different fields of view of the common region of each field of view of light within the covered range at the height of a half of the entrance pupil diameter (HEP). With greater thickness, the ability to correct aberration is better. However, the difficulty of manufacturing increases as well. Therefore, the thickness at the height of a half of the entrance pupil diameter (HEP) of any lens has to be controlled. The ratio between the thickness (ETP) at the height of a half of the entrance pupil diameter (HEP) and the thickness (TP) of any lens on the optical axis (i.e., ETP/TP) has to be particularly controlled. For example, the thickness at the height of a half of the entrance pupil diameter (HEP) of the first lens is denoted by ETP1, the thickness at the height of a half of the entrance pupil diameter (HEP) of the second lens is denoted by ETP2, and the thickness at the height of a half of the entrance pupil diameter (HEP) of any other lens in the optical image capturing system is denoted in the same manner. The optical image capturing system of the present invention satisfies:

$$0.3 \leq SETP/EIN < 1;$$

where SETP is the sum of the aforementioned ETP1 to ETP5.

In order to enhance the ability of correcting aberration and to lower the difficulty of manufacturing at the same time, the ratio between the thickness (ETP) at the height of a half of the entrance pupil diameter (HEP) and the thickness (TP) of any lens on the optical axis (i.e., ETP/TP) has to be particularly controlled. For example, the thickness at the height of a half of the entrance pupil diameter (HEP) of the first lens is denoted by ETP1, the thickness of the first lens on the optical axis is TP1, and the ratio between these two parameters is ETP1/TP1; the thickness at the height of a half of the entrance pupil diameter (HEP) of the first lens is denoted by ETP2, the thickness of the second lens on the optical axis is TP2, and the ratio between these two parameters is ETP2/TP2. The ratio between the thickness at the height of a half of the entrance pupil diameter (HEP) and the thickness of any other lens in the optical image capturing system is denoted in the same manner. The optical image capturing system of the present invention satisfies:

$$0.2 \leq ETP/TP \leq 3.$$

The horizontal distance between two neighboring lenses at the height of a half of the entrance pupil diameter (HEP) is denoted by ED, wherein the aforementioned horizontal distance (ED) is parallel to the optical axis of the optical image capturing system, and particularly affects the ability of correcting aberration and differences between optical paths of light in different fields of view of the common region of each field of view of light at the height of a half of the entrance pupil diameter (HEP). With longer distance, the ability to correct aberration is potential to be better. However, the difficulty of manufacturing increases, and the feasibility of "slightly shorten" the length of the optical image capturing system is limited as well. Therefore, the horizontal distance (ED) between two specific neighboring lenses at the height of a half of the entrance pupil diameter (HEP) has to be controlled.

In order to enhance the ability of correcting aberration and to lower the difficulty of "slightly shorten" the length of the optical image capturing system at the same time, the ratio between the horizontal distance (ED) between two neighboring lenses at the height of a half of the entrance pupil diameter (HEP) and the parallel distance (IN) between these two neighboring lens on the optical axis (i.e., ED/IN) has to be particularly controlled. For example, the horizontal distance between the first lens and the second lens at the height of a half of the entrance pupil diameter (HEP) is denoted by ED12, the horizontal distance between the first lens and the second lens on the optical axis is denoted by IN12, and the ratio between these two parameters is ED12/IN12; the horizontal distance between the second lens and the third lens at the height of a half of the entrance pupil diameter (HEP) is denoted by ED23, the horizontal distance between the second lens and the third lens on the optical axis is denoted by IN23, and the ratio between these two parameters is ED23/IN23. The ratio between the horizontal distance between any two neighboring lenses at the height of a half of the entrance pupil diameter (HEP) and the horizontal distance between these two neighboring lenses on the optical axis is denoted in the same manner.

The horizontal distance in parallel with the optical axis between a coordinate point at the height of ½ HEP on the image-side surface of the fifth lens and image surface is denoted by EBL. The horizontal distance in parallel with the optical axis between the point on the image-side surface of the fifth lens where the optical axis passes through and the image plane is denoted by BL. In order to enhance the ability to correct aberration and to preserve more space for other optical components, the optical image capturing system of the present invention can satisfy: $0.2 \leq EBL/BL \leq 1$. The optical image capturing system can further include a filtering component, which is provided between the fifth lens and the image plane, wherein the horizontal distance in parallel with the optical axis between the coordinate point at the height of ½ HEP on the image-side surface of the fifth lens and the filtering component is denoted by EIR, and the horizontal distance in parallel with the optical axis between the point on the image-side surface of the fifth lens where the optical axis passes through and the filtering component is denoted by PIR. The optical image capturing system of the present invention can satisfy: $0.2 \leq EIR/PIR \leq 0.8$.

In an embodiment, a height of the optical image capturing system (HOS) can be reduced while $|f1|>f5$.

In an embodiment, when the lenses satisfy $f2|+|f3|+|f4|$ and $|f1|+|f5|$, at least one lens among the second to the fourth lenses could have weak positive refractive power or weak negative refractive power. Herein the weak refractive power means the absolute value of the focal length of one specific lens is greater than 10. When at least one lens among the second to the fourth lenses has weak positive refractive power, it may share the positive refractive power of the first lens, and on the contrary, when at least one lens among the second to the fourth lenses has weak negative refractive power, it may fine tune and correct the aberration of the system.

In an embodiment, the fifth lens could have negative refractive power, and an image-side surface thereof is concave, it may reduce back focal length and size. Besides, the fifth lens can have at least an inflection point on at least a surface thereof, which may reduce an incident angle of the light of an off-axis field of view and correct the aberration of the off-axis field of view.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1A:
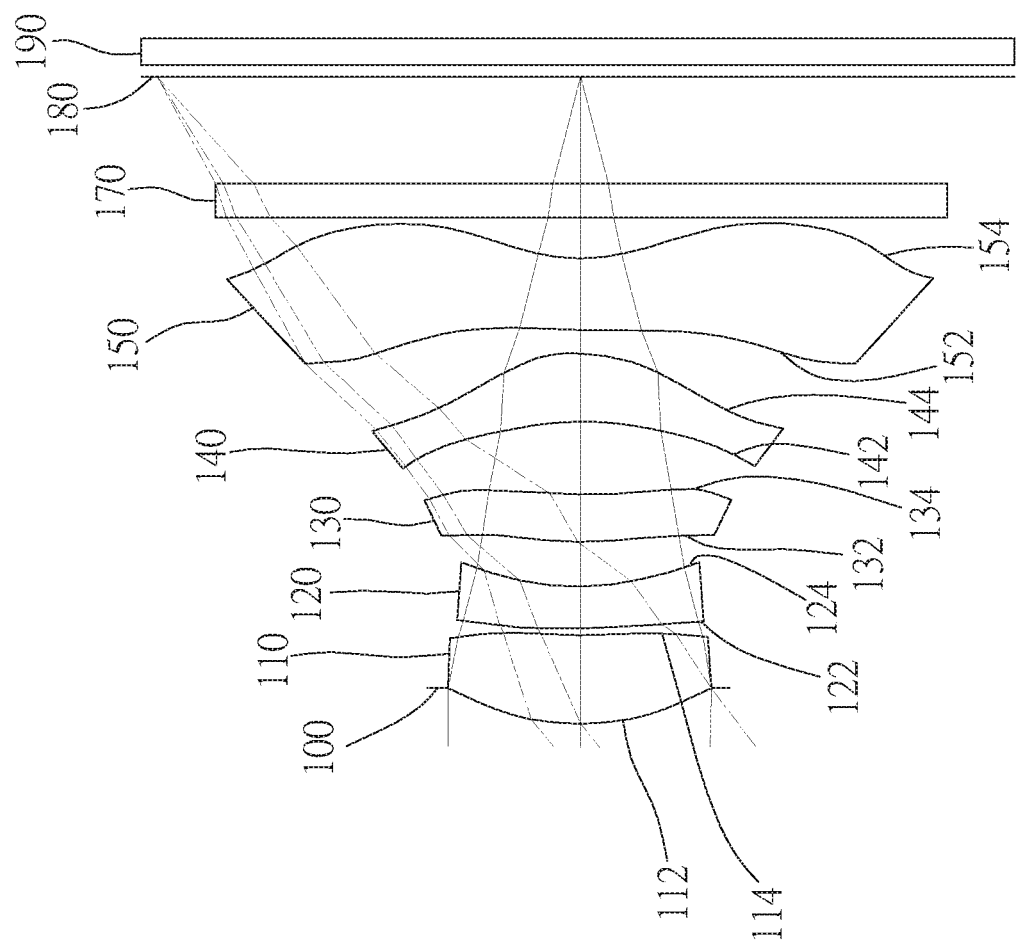
FIG. 1A is a schematic diagram of a first embodiment of the present invention.

An optical image capturing system of the present invention includes a first lens, a second lens, a third lens, a fourth lens, a fifth lens, and an image plane from an object side to an image side. The optical image capturing system further is provided with an image sensor at an image plane.

The optical image capturing system can work in three wavelengths, including 486.1 nm, 587.5 nm, and 656.2 nm, wherein 587.5 nm is the main reference wavelength and is the reference wavelength for obtaining the technical characters. The optical image capturing system can also work in five wavelengths, including 470 nm, 510 nm, 555 nm, 610 nm, and 650 nm wherein 555 nm is the main reference wavelength, and is the reference wavelength for obtaining the technical characters.

The optical image capturing system of the present invention satisfies $0.5 \leq \Sigma PPR/|\Sigma NPR| \leq 3.0$, and a preferable range is $1 \leq \Sigma PPR/|\Sigma NPR| \leq 2.5$, where PPR is a ratio of the focal length f of the optical image capturing system to a focal length fp of each of lenses with positive refractive power; NPR is a ratio of the focal length f of the optical image capturing system to a focal length fn of each of lenses with negative refractive power; $\Sigma PPR$ is a sum of the PPRs of each positive lens; and $\Sigma NPR$ is a sum of the NPRs of each negative lens. It is helpful for control of an entire refractive power and an entire length of the optical image capturing system.

The first lens can have positive refractive power, and an object-side surface, which faces the object side, thereof can be convex. It may modify the positive refractive power of the first lens as well as shorten the entire length of the system.

The second lens can have negative refractive power, and an object-side surface, which faces the object side, thereof can be convex. It may correct the aberration of the first lens.

The third lens can have positive refractive power, and an image-side surface, which faces the image side, thereof can be convex. It may share the positive refractive power of the first lens, which prevents excessively increasing the spherical aberration, and lowers the sensitivity of the optical image capturing system.

The fourth lens can have positive refractive power, wherein at least one surface of the fourth lens can have at least an inflection point thereon. It may effectively adjust the incidence angle on the fourth lens of each field of view to improve the spherical aberration.

The fifth lens has negative refractive power, and an image-side surface, which faces the image side, thereof can be concave. It may shorten the back focal length to keep the system miniaturized. Besides, the fifth lens has at least an inflection point on at least a surface thereof to reduce the incident angle of the off-axis view angle light.

The image sensor is provided on the image plane. The optical image capturing system of the present invention satisfies $HOS/HOI \leq 3$ and $0.5 \leq HOS/f \leq 2.5$, and a preferable range is 1≤HOS/HOI≤2.5 and 1≤HOS/f≤2, where HOI is a half of a diagonal of an effective sensing area of the image sensor, i.e., the maximum image height, and HOS is a height of the optical image capturing system, i.e. a distance on the optical axis between the object-side surface of the first lens and the image plane. It is helpful for reduction of the size of the system for used in compact cameras.

The optical image capturing system of the present invention further is provided with an aperture to increase image quality.

In the optical image capturing system of the present invention, the aperture could be a front aperture or a middle aperture, wherein the front aperture is provided between the object and the first lens, and the middle is provided between the first lens and the image plane. The front aperture provides a long distance between an exit pupil of the system and the image plane, which allows more elements to be installed. The middle could enlarge a view angle of view of the system and increase the efficiency of the image sensor. The optical image capturing system satisfies 0.5≤InS/HOS≤1.1, where InS is a distance between the aperture and the image plane. It is helpful for size reduction and wide angle.

The optical image capturing system of the present invention satisfies 0.1≤ΣTP/InTL≤0.9, where InTL is a distance between the object-side surface of the first lens and the image-side surface of the fifth lens, and ΣTP is a sum of central thicknesses of the lenses on the optical axis. It is helpful for the contrast of image and yield rate of manufacture and provides a suitable back focal length for installation of other elements.

The optical image capturing system of the present invention satisfies 0.01<|R1/R2|<20, and a preferable range is 0.05<|R1/R2|<0.9, where R1 is a radius of curvature of the object-side surface of the first lens, and R2 is a radius of curvature of the image-side surface of the first lens. It provides the first lens with a suitable positive refractive power to reduce the increase rate of the spherical aberration.

The optical image capturing system of the present invention satisfies −7<(R9−R10)/(R9+R10)<200, where R9 is a radius of curvature of the object-side surface of the fifth lens, and R10 is a radius of curvature of the image-side surface of the fifth lens. It may modify the astigmatic field curvature.

The optical image capturing system of the present invention satisfies IN12/f≤0.8, where IN12 is a distance on the optical axis between the first lens and the second lens. It may correct chromatic aberration and improve the performance.

The optical image capturing system of the present invention satisfies IN45/f≤0.8, where IN45 is a distance on the optical axis between the fourth lens and the fifth lens. It may correct chromatic aberration and improve the performance.

The optical image capturing system of the present invention satisfies 0.1≤(TP1+IN12)/TP2≤10.0, where TP1 is a central thickness of the first lens on the optical axis, and TP2 is a central thickness of the second lens on the optical axis. It may control the sensitivity of manufacture of the system and improve the performance.

The optical image capturing system of the present invention satisfies 0.1≤(TP5+IN45)/TP4≤10.0, where TP4 is a central thickness of the fourth lens on the optical axis, TP5 is a central thickness of the fifth lens on the optical axis, and IN45 is a distance between the fourth lens and the fifth lens. It may control the sensitivity of manufacture of the system and improve the performance.

The optical image capturing system of the present invention satisfies 0.1≤TP3/(IN23+TP3+IN34)<1, where TP2 is a central thickness of the second lens on the optical axis, TP3 is a central thickness of the third lens on the optical axis, TP4 is a central thickness of the fourth lens on the optical axis, IN23 is a distance on the optical axis between the second lens and the third lens, IN34 is a distance on the optical axis between the third lens and the fourth lens, and InTL is a distance between the object-side surface of the first lens and the image-side surface of the fifth lens. It may fine tune and correct the aberration of the incident rays layer by layer, and reduce the height of the system.

The optical image capturing system satisfies 0 mm≤HVT51≤3 mm; 0 mm<HVT52≤6 mm; 0≤HVT51/HVT52; 0 mm≤|SGC51|≤0.5 mm; 0 mm<|SGC52|≤2 mm; and 0<|SGC52|/(|SGC52|+TP5)≤0.9, where HVT51 a distance perpendicular to the optical axis between the critical point C51 on the object-side surface of the fifth lens and the optical axis; HVT52 a distance perpendicular to the optical axis between the critical point C52 on the image-side surface of the fifth lens and the optical axis; SGC51 is a distance in parallel with the optical axis between an point on the object-side surface of the fifth lens where the optical axis passes through and the critical point C51; SGC52 is a distance in parallel with the optical axis between an point on the image-side surface of the fifth lens where the optical axis passes through and the critical point C52. It is helpful to correct the off-axis view field aberration.

The optical image capturing system satisfies 0.2≤HVT52/HOI≤0.9, and preferably satisfies 0.3≤HVT52/HOI≤0.8. It may help to correct the peripheral aberration.

The optical image capturing system satisfies 0≤HVT52/HOS≤0.5, and preferably satisfies 0.2≤HVT52/HOS≤0.45. It may help to correct the peripheral aberration.

The optical image capturing system of the present invention satisfies 0<SGI511/(SGI511+TP5)≤0.9; 0<SGI521/(SGI521+TP5)≤0.9, and it is preferable to satisfy 0.1≤SGI511/(SGI511+TP5)≤0.6; 0.1≤SGI521/(SGI521+TP5)≤0.6, where SGI511 is a displacement in parallel with the optical axis, from a point on the object-side surface of the fifth lens, through which the optical axis passes, to the inflection point on the object-side surface, which is the closest to the optical axis, and SGI521 is a displacement in parallel with the optical axis, from a point on the image-side surface of the fifth lens, through which the optical axis passes, to the inflection point on the image-side surface, which is the closest to the optical axis.

The optical image capturing system of the present invention satisfies 0<SGI512/(SGI512+TP5)≤0.9; 0<SGI522/(SGI522+TP5)≤0.9, and it is preferable to satisfy 0.1≤SGI512/(SGI512+TP5)≤0.6; 0.1≤SGI522/(SGI522+TP5)≤0.6, where SGI512 is a displacement in parallel with the optical axis, from a point on the object-side surface of the fifth lens, through which the optical axis passes, to the inflection point on the object-side surface, which is the second closest to the optical axis, and SGI522 is a displacement in parallel with the optical axis, from a point on the image-side surface of the fifth lens, through which the optical axis passes, to the inflection point on the image-side surface, which is the second closest to the optical axis.

The optical image capturing system of the present invention satisfies 0.001 mm≤|HIF511|≤5 mm; 0.001 mm≤|HIF521|≤5 mm, and it is preferable to satisfy 0.1 mm≤|HIF511|≤3.5 mm; 1.5 mm≤|HIF521|≤3.5 mm, where HIF511 is a distance perpendicular to the optical axis between the inflection point on the object-side surface of the fifth lens, which is the closest to the optical axis, and the optical axis; HIF521 is a distance perpendicular to the optical axis between the inflection point on the image-side surface of the fifth lens, which is the closest to the optical axis, and the optical axis.

The optical image capturing system of the present invention satisfies 0.001 mm≤|HIF512|≤5 mm; 0.001 mm≤|HIF522|≤5 mm, and it is preferable to satisfy 0.1 mm≤|HIF522|≤3.5 mm; 0.1 mm≤|HIF512|≤3.5 mm, where HIF512 is a distance perpendicular to the optical axis between the inflection point on the object-side surface of the fifth lens, which is the second closest to the optical axis, and the optical axis; HIF522 is a distance perpendicular to the optical axis between the inflection point on the image-side surface of the fifth lens, which is the second closest to the optical axis, and the optical axis.

The optical image capturing system of the present invention satisfies 0.001 mm≤|HIF513|≤5 mm; 0.001 mm≤|HIF523|≤5 mm, and it is preferable to satisfy 0.1 mm≤|HIF523|≤3.5 mm; 0.1 mm≤|HIF513|≤3.5 mm, where HIF513 is a distance perpendicular to the optical axis between the inflection point on the object-side surface of the fifth lens, which is the third closest to the optical axis, and the optical axis; HIF523 is a distance perpendicular to the optical axis between the inflection point on the image-side surface of the fifth lens, which is the third closest to the optical axis, and the optical axis.

The optical image capturing system of the present invention satisfies 0.001 mm≤|HIF514|≤5 mm; 0.001 mm≤|HIF524|≤5 mm, and it is preferable to satisfy 0.1 mm≤|HIF524|≤3.5 mm; 0.1 mm≤|HIF514|≤3.5 mm, where HIF514 is a distance perpendicular to the optical axis between the inflection point on the object-side surface of the fifth lens, which is the fourth closest to the optical axis, and the optical axis; HIF524 is a distance perpendicular to the optical axis between the inflection point on the image-side surface of the fifth lens, which is the fourth closest to the optical axis, and the optical axis.

In an embodiment, the lenses of high Abbe number and the lenses of low Abbe number are arranged in an interlaced arrangement that could be helpful for correction of aberration of the system.

An equation of aspheric surface is $$z=ch^2/[1+[1(k+1)c^2h^2]^{0.5}]+A4h^4+A6h^6+A8h^8+A10h^{10}+A12h^{12}+A14h^{14}+A16h^{16}+A18h^{18}+A20h^{20}+\ldots \quad (1)$$

where z is a depression of the aspheric surface; k is conic constant; c is reciprocal of the radius of curvature; and A4, A6, A8, A10, A12, A14, A16, A18, and A20 are high-order aspheric coefficients.

In the optical image capturing system, the lenses could be made of plastic or glass. The plastic lenses may reduce the weight and lower the cost of the system, and the glass lenses may control the thermal effect and enlarge the space for arrangement of the refractive power of the system. In addition, the opposite surfaces (object-side surface and image-side surface) of the first to the fifth lenses could be aspheric that can obtain more control parameters to reduce aberration. The number of aspheric glass lenses could be less than the conventional spherical glass lenses, which is helpful for reduction of the height of the system.

When the lens has a convex surface, which means that the surface is convex around a position, through which the optical axis passes, and when the lens has a concave surface, which means that the surface is concave around a position, through which the optical axis passes.

The optical image capturing system of the present invention could be applied in a dynamic focusing optical system. It is superior in the correction of aberration and high imaging quality so that it could be allied in lots of fields.

The optical image capturing system of the present invention could further include a driving module to meet different demands, wherein the driving module can be coupled with the lenses to move the lenses. The driving module can be a voice coil motor (VCM), which is used to move the lens for focusing, or can be an optical image stabilization (OIS) component, which is used to lower the possibility of having the problem of image blurring which is caused by subtle movements of the lens while shooting.

We provide several embodiments in conjunction with the accompanying drawings for the best understanding, which are:

First Embodiment

Figure 1B:
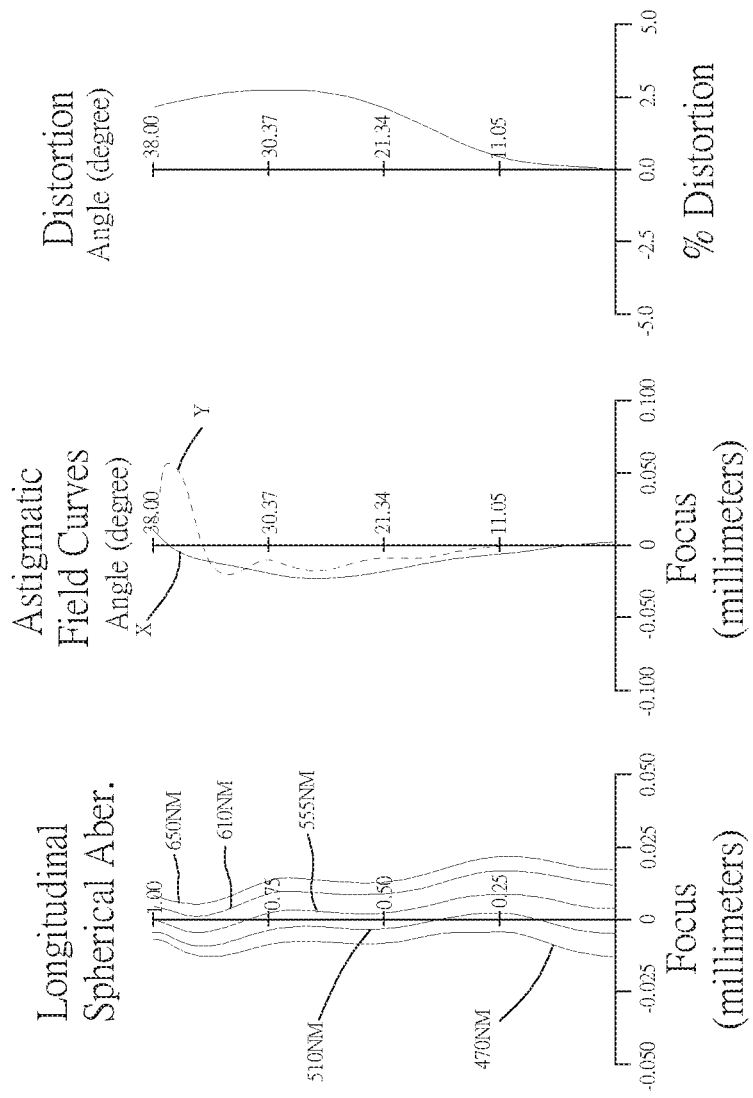
FIG. 1B shows curve diagrams of longitudinal spherical aberration, astigmatic field, and optical distortion of the optical image capturing system in the order from left to right of the first embodiment of the present application.
Figure 1C:
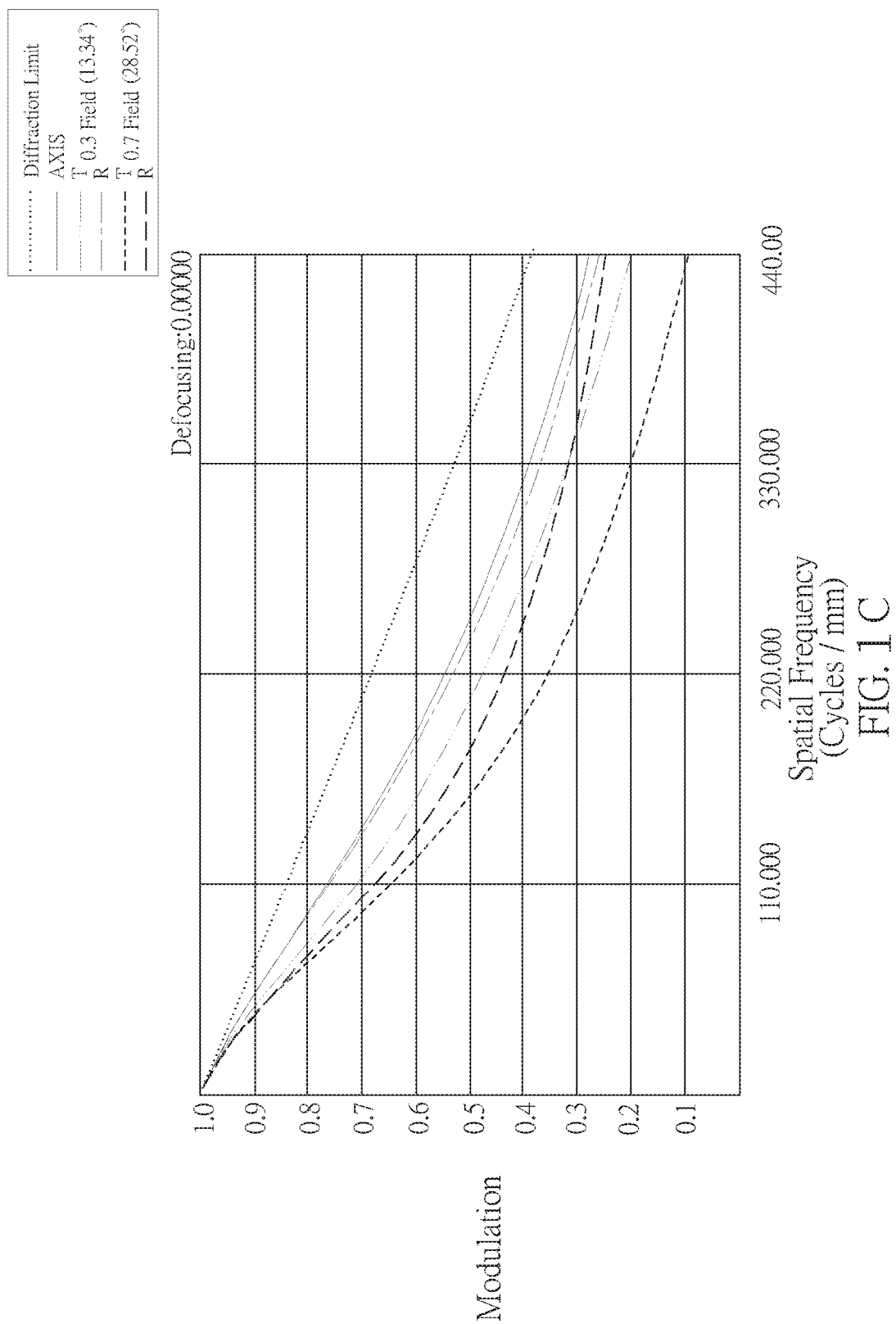
FIG. 1C shows a feature map of modulation transformation of the optical image capturing system of the first embodiment of the present application.

As shown in FIG. 1A and FIG. 1B, an optical image capturing system 10 of the first embodiment of the present invention includes, along an optical axis from an object side to an image side, a first lens 110, an aperture 100, a second lens 120, a third lens 130, a fourth lens 140, a fifth lens 150, an infrared rays filter 180, an image plane 190, and an image sensor 192. FIG. 1C shows a modulation transformation of the optical image capturing system 10 of the first embodiment of the present application.

The first lens 110 has positive refractive power and is made of plastic. An object-side surface 112 thereof, which faces the object side, is a convex aspheric surface, and an image-side surface 114 thereof, which faces the image side, is a concave aspheric surface. The object-side surface 112 and the image-side surface 114 both have an inflection point thereon. A thickness of the first lens 110 on the optical axis is TP1, and a thickness of the first lens 110 at the height of a half of the entrance pupil diameter (HEP) is denoted by ETP1.

The first lens satisfies SGI111=0.19728 mm; |SGI111|/(|SGI111|+TP1)=0.24340; SGI121=0.00216 mm; |SGI121|/(|SGI121|+TP1)=0.00351, where SGI111 is a displacement in parallel with the optical axis from a point on the object-side surface of the first lens, through which the optical axis passes, to the inflection point on the object-side surface, which is the closest to the optical axis, and SGI121 is a displacement in parallel with the optical axis from a point on the image-side surface of the first lens, through which the optical axis passes, to the inflection point on the image-side surface, which is the closest to the optical axis.

The first lens satisfies HIF111=0.81258 mm; HIF111/HOI=0.27700; HIF121=0.22793 mm; HIF121/HOI=0.07770, where HIF111 is a displacement perpendicular to the optical axis from a point on the object-side surface of the first lens, through which the optical axis passes, to the inflection point, which is the closest to the optical axis; HIF121 is a displacement perpendicular to the optical axis from a point on the image-side surface of the first lens, through which the optical axis passes, to the inflection point, which is the closest to the optical axis.

The second lens 120 has negative refractive power and is made of plastic. An object-side surface 122 thereof, which faces the object side, is a convex aspheric surface, and an image-side surface 124 thereof, which faces the image side, is a concave aspheric surface. A thickness of the second lens 120 on the optical axis is TP2, and thickness of the second lens 120 at the height of a half of the entrance pupil diameter (HEP) is denoted by ETP2.

For the second lens, a displacement in parallel with the optical axis from a point on the object-side surface of the second lens, through which the optical axis passes, to the inflection point on the image-side surface, which is the closest to the optical axis is denoted by SGI211, and a displacement in parallel with the optical axis from a point on the image-side surface of the second lens, through which the optical axis passes, to the inflection point on the image-side surface, which is the closest to the optical axis is denoted by SGI221.

For the second lens, a displacement perpendicular to the optical axis from a point on the object-side surface of the second lens, through which the optical axis passes, to the inflection point, which is the closest to the optical axis is denoted by HIF211, and a displacement perpendicular to the optical axis from a point on the image-side surface of the second lens, through which the optical axis passes, to the inflection point, which is the closest to the optical axis is denoted by HIF221.

The third lens 130 has positive refractive power and is made of plastic. An object-side surface 132, which faces the object side, is a convex aspheric surface, and an image-side surface 134, which faces the image side, is a concave aspheric surface. The object-side surface 132 and the image-side surface 134 both have two inflection points. A thickness of the third lens 130 on the optical axis is TP3, and a thickness of the third lens 130 at the height of a half of the entrance pupil diameter (HEP) is denoted by ETP3.

The third lens 130 satisfies SGI311=0.03298 mm; |SGI311|/(|SGI311|+TP3)=0.09002; SGI321=0.02042 mm; |SGI321|/(|SGI321|+TP3)=0.05772, where SGI311 is a displacement in parallel with the optical axis, from a point on the object-side surface of the third lens, through which the optical axis passes, to the inflection point on the object-side surface, which is the closest to the optical axis, and SGI321 is a displacement in parallel with the optical axis, from a point on the image-side surface of the third lens, through which the optical axis passes, to the inflection point on the image-side surface, which is the closest to the optical axis.

The third lens 130 further satisfies SGI312=0.05207 mm; ↑SGI312|/(|SGI312|+TP3)=0.13510; SGI322=−0.02201 mm; |SGI322|/(|SGI322|+TP3)=0.06193, where SGI312 is a displacement in parallel with the optical axis, from a point on the object-side surface of the third lens, through which the optical axis passes, to the inflection point on the object-side surface, which is the second closest to the optical axis, and SGI322 is a displacement in parallel with the optical axis, from a point on the image-side surface of the third lens, through which the optical axis passes, to the inflection point on the object-side surface, which is the second closest to the optical axis.

The third lens 130 further satisfies HIF311=0.44853 mm; HIF311/HOI=0.15290; HIF321=0.44486 mm; HIF321/HOI=0.15165, where HIF311 is a distance perpendicular to the optical axis between the inflection point on the object-side surface of the third lens, which is the closest to the optical axis, and the optical axis; HIF321 is a distance perpendicular to the optical axis between the inflection point on the image-side surface of the third lens, which is the closest to the optical axis, and the optical axis.

The third lens 130 further satisfies HIF312=0.90272 mm; HIF312/HOI=0.30773; HIF322=1.01361 mm; HIF322/HOI=0.34553, where HIF312 is a distance perpendicular to the optical axis between the inflection point on the object-side surface of the third lens, which is the second closest to the optical axis, and the optical axis; HIF322 is a distance perpendicular to the optical axis between the inflection point on the image-side surface of the third lens, which is the second closest to the optical axis, and the optical axis.

The fourth lens 140 has positive refractive power and is made of plastic. An object-side surface 142, which faces the object side, is a concave aspheric surface, and an image-side surface 144, which faces the image side, is a convex aspheric surface. The image-side surface 144 has two inflection points. A thickness of the fourth lens 140 on the optical axis is TP4, and a thickness of the fourth lens 140 at the height of a half of the entrance pupil diameter (HEP) is denoted by ETP4.

The fourth lens 140 satisfies SGI421=−0.29255 mm; |SGI421|/(|SGI421|FTP4)=0.38267, where SGI411 is a displacement in parallel with the optical axis, from a point on the object-side surface of the fourth lens, through which the optical axis passes, to the inflection point on the object-side surface, which is the closest to the optical axis, and SGI421 is a displacement in parallel with the optical axis, from a point on the image-side surface of the fourth lens, through which the optical axis passes, to the inflection point on the image-side surface, which is the closest to the optical axis.

The fourth lens 140 further satisfies SGI422=−0.48851 mm; |SGI422|/(|SGI422|+TP4)=0.50862, where SGI412 is a displacement in parallel with the optical axis, from a point on the object-side surface of the fourth lens, through which the optical axis passes, to the inflection point on the object-side surface, which is the second closest to the optical axis, and SGI422 is a displacement in parallel with the optical axis, from a point on the image-side surface of the fourth lens, through which the optical axis passes, to the inflection point on the object-side surface, which is the second closest to the optical axis.

The fourth lens 140 further satisfies HIF421=0.82535 mm; HIF421/HOI=0.28135, where HIF411 is a distance perpendicular to the optical axis between the inflection point on the object-side surface of the fourth lens, which is the closest to the optical axis, and the optical axis; HIF421 is a distance perpendicular to the optical axis between the inflection point on the image-side surface of the fourth lens, which is the closest to the optical axis, and the optical axis.

The fourth lens 140 further satisfies HIF422=1.28471 mm; HIF422/HOI=0.43794, where HIF412 is a distance perpendicular to the optical axis between the inflection point on the object-side surface of the fourth lens, which is the second closest to the optical axis, and the optical axis; HIF422 is a distance perpendicular to the optical axis between the inflection point on the image-side surface of the fourth lens, which is the second closest to the optical axis, and the optical axis.

The fifth lens 150 has negative refractive power and is made of plastic. An object-side surface 152, which faces the object side, is a convex aspheric surface, and an image-side surface 154, which faces the image side, is a concave aspheric surface. The object-side surface 152 and the image-side surface 154 both have two inflection points. A thickness of the fifth lens 150 on the optical axis is TP5, and a thickness of the fifth lens 150 at the height of a half of the entrance pupil diameter (HEP) is denoted by ETP5.

The fifth lens 150 satisfies SGI511=0.00673 mm; |SGI511|/(|SGI511|+TP5)=0.01323; SGI521=0.09725 mm; |SGI521|/(|SGI521|+TP5)=0.16225, where SGI511 is a displacement in parallel with the optical axis, from a point on the object-side surface of the fifth lens, through which the optical axis passes, to the inflection point on the object-side surface, which is the closest to the optical axis, and SGI521 is a displacement in parallel with the optical axis, from a point on the image-side surface of the fifth lens, through which the optical axis passes, to the inflection point on the image-side surface, which is the closest to the optical axis.

The fifth lens 150 further satisfies SGI512=−0.11308 mm; |SGI512|/(|SGI512|+TP5)=0.18381; SGI522=−0.00604 mm; |SGI522|/(|SGI522|+TP5)=0.01188, where SGI512 is a displacement in parallel with the optical axis, from a point on the object-side surface of the fifth lens, through which the optical axis passes, to the inflection point on the object-side surface, which is the second closest to the optical axis, and SGI522 is a displacement in parallel with the optical axis, from a point on the image-side surface of the fifth lens, through which the optical axis passes, to the inflection point on the object-side surface, which is the second closest to the optical axis.

The fifth lens 150 further satisfies HIF511=0.27152 mm; HIF511/HOI=0.09256; HIF521=0.50870 mm; HIF521/HOI=0.17341, where HIF511 is a distance perpendicular to the optical axis between the inflection point on the object-side surface of the fifth lens, which is the closest to the optical axis, and the optical axis; HIF521 is a distance perpendicular to the optical axis between the inflection point on the image-side surface of the fifth lens, which is the closest to the optical axis, and the optical axis.

The fourth lens 140 further satisfies HIF512=1.26187 mm; HIF512/HOI=0.43016; HIF512=2.13468 mm; HIF512/HOI=0.72769, where HIF512 is a distance perpendicular to the optical axis between the inflection point on the object-side surface of the fifth lens, which is the second closest to the optical axis, and the optical axis; HIF522 is a distance perpendicular to the optical axis between the inflection point on the image-side surface of the fifth lens, which is the second closest to the optical axis, and the optical axis.

A distance in parallel with the optical axis between a coordinate point at a height of ½ HEP on the object-side surface of the first lens 110 and the image plane is ETL, and a distance in parallel with the optical axis between the coordinate point at the height of ½ HEP on the object-side surface of the first lens 110 and a coordinate point at a height of ½ HEP on the image-side surface of the fourth lens 140 is EIN, which satisfy: ETL=4.248 mm; EIN=3.180 mm; and EIN/ETL=0.749.

The optical image capturing system of the first embodiment satisfies: ETP1=0.350 mm; ETP2=0.444 mm; ETP3=0.294 mm; ETP4=0.293 mm; ETP5=0.717 mm. The sum of the aforementioned ETP1 to ETP5 is SETP, wherein SETP=2.098 mm. In addition, TP1=0.613 mm; TP2=0.300 mm; TP3=0.333 mm; TP4=0.472 mm; TP5=0.502 mm. The sum of the aforementioned TP1 to TP5 is STP, wherein STP=2.221 mm; SETP/STP=0.945.

In order to enhance the ability of correcting aberration and to lower the difficulty of manufacturing at the same time, the ratio between the thickness (ETP) at the height of a half of the entrance pupil diameter (HEP) and the thickness (TP) of any lens on the optical axis (i.e., ETP/TP) in the optical image capturing system of the first embodiment is particularly controlled, which satisfies: ETP1/TP1=0.571; ETP2/TP2=1.481; ETP3/TP3=0.883; ETP4/TP4=0.620; ETP5/TP5=1.428.

In order to enhance the ability of correcting aberration, lower the difficulty of manufacturing, and "slightly shortening" the length of the optical image capturing system at the same time, the ratio between the horizontal distance (ED) between two neighboring lenses at the height of a half of the entrance pupil diameter (HEP) and the parallel distance (IN) between these two neighboring lens on the optical axis (i.e., ED/IN) in the optical image capturing system of the first embodiment is particularly controlled, which satisfies: the horizontal distance between the first lens 110 and the second lens 120 at the height of a half of the entrance pupil diameter (HEP) is denoted by ED12, wherein ED12=0.131 mm; the horizontal distance between the second lens 120 and the third lens 130 at the height of a half of the entrance pupil diameter (HEP) is denoted by ED23, wherein ED23=0.144 mm; the horizontal distance between the third lens 130 and the fourth lens 140 at the height of a half of the entrance pupil diameter (HEP) is denoted by ED34, wherein ED34=0.334 mm; the horizontal distance between the fourth lens 140 and the fifth lens 150 at the height of a half of the entrance pupil diameter (HEP) is denoted by ED45, wherein ED45=0.474 mm. The sum of the aforementioned ED12 to ED45 is SED, wherein SED=1.082 mm.

The horizontal distance between the first lens 110 and the second lens 120 on the optical axis is denoted by IN12, wherein IN12=0.038 mm, and ED12/IN12=3.411. The horizontal distance between the second lens 120 and the third lens 130 on the optical axis is denoted by IN23, wherein IN23=0.300 mm, and ED23/IN23=0.497. The horizontal distance between the third lens 130 and the fourth lens 140 on the optical axis is denoted by IN34, wherein IN34=0.502 mm, and ED34/IN34=0.664. The horizontal distance between the fourth lens 140 and the fifth lens 150 on the optical axis is denoted by IN45, wherein IN45=0.158 mm, and ED45/IN45=2.992. The sum of the aforementioned IN12 to IN45 is denoted by SIN, wherein SIN=0.999, and SED/SIN=1.083.

The optical image capturing system of the first embodiment satisfies: ED12/ED23=0.912; ED23/ED34=0.431; ED34/ED45=0.704; IN12/IN23=0.128; IN23/IN34=0.597; IN34/IN45=3.173.

The horizontal distance in parallel with the optical axis between a coordinate point at the height of ½ HEP on the image-side surface of the fifth lens 150 and image surface is denoted by EBL, wherein EBL=1.068 mm. The horizontal distance in parallel with the optical axis between the point on the image-side surface of the fifth lens 150 where the optical axis passes through and the image plane is denoted by BL, wherein BL=1.26023 mm. The optical image capturing system of the first embodiment satisfies: EBL/BL=0.84746. The horizontal distance in parallel with the optical axis between the coordinate point at the height of ½ HEP on the image-side surface of the fifth lens 150 and the infrared rays filter 180 is denoted by EIR, wherein EIR=0.045 mm. The horizontal distance in parallel with the optical axis between the point on the image-side surface of the fifth lens 150 where the optical axis passes through and the infrared rays filter 180 is denoted by PIR, wherein PIR=0.240 mm, and it satisfies: EIR/PIR=0.186.

The infrared rays filter 180 is made of glass and between the fifth lens 150 and the image plane 190. The infrared rays filter 180 gives no contribution to the focal length of the system.

The optical image capturing system 10 of the first embodiment has the following parameters, which are f=3.68765 mm; f/HEP=2.05; and HAF=38 and tan(HAF)=0.7813, where f is a focal length of the system; HAF is a half of the maximum field angle; and HEP is an entrance pupil diameter.

The parameters of the lenses of the first embodiment are f1=3.65523 mm; |f/f1|=1.0089; f5=−2.41708; and |f1|>f5, where f1 is a focal length of the first lens 110; and f5 is a focal length of the fifth lens 150.

The first embodiment further satisfies |f2|+|f3|+|f4|=20.3329; |f1|+|f5|=6.0723 and |f2|+|f3|+|f4|>|f1|+|f5|, where f2 is a focal length of the second lens 120, f3 is a focal length of the third lens 130, f4 is a focal length of the fourth lens 140, and f5 is a focal length of the fifth lens 150.

The optical image capturing system 10 of the first embodiment further satisfies ΣPPR=f/f1+f/f3+f/f4=2.70744; ΣNPR=f/f2+f/f5=2.09358; ΣPPR/|ΣNPR|=1.29321; |f/f2|=0.5679; |f/f3|=0.3309; |f/f4|=1.3676; |f/f5|=0.83745; |f/f5|=1.5257, where PPR is a ratio of a focal length f of the optical image capturing system to a focal length fp of each of the lenses with positive refractive power; and NPR is a ratio of a focal length f of the optical image capturing system to a focal length fn of each of lenses with negative refractive power.

The optical image capturing system 10 of the first embodiment further satisfies InTL+BFL=HOS; HOS=4.48 mm; HOI=2.9335 mm; HOS/HOI=1.5272; HOS/f=1.2149; InS=4.2449 mm; and InS/HOS=0.9475, where InTL is a distance between the object-side surface 112 of the first lens 110 and the image-side surface 154 of the fifth lens 150; HOS is a height of the image capturing system, i.e. a distance between the object-side surface 112 of the first lens 110 and the image plane 190; InS is a distance between the aperture 100 and the image plane 190; HOI is a half of a diagonal of an effective sensing area of the image sensor 192, i.e., the maximum image height; and BFL is a distance between the image-side surface 154 of the fifth lens 150 and the image plane 190.

The optical image capturing system 10 of the first embodiment further satisfies ΣTP=2.2206 mm and ΣTP/InTL=0.6897, where ΣTP is a sum of the thicknesses of the lenses 110-150 with refractive power. It is helpful for the contrast of image and yield rate of manufacture and provides a suitable back focal length for installation of other elements.

The optical image capturing system 10 of the first embodiment further satisfies |R1/R2|=0.1749, where R1 is a radius of curvature of the object-side surface 112 of the first lens 110, and R2 is a radius of curvature of the image-side surface 114 of the first lens 110. It provides the first lens with a suitable positive refractive power to reduce the increase rate of the spherical aberration.

The optical image capturing system 10 of the first embodiment further satisfies (R9−R10)/(R9+R10)=0.6433, where R9 is a radius of curvature of the object-side surface 152 of the fifth lens 150, and R10 is a radius of curvature of the image-side surface 154 of the fifth lens 150. It may modify the astigmatic field curvature.

The optical image capturing system 10 of the first embodiment further satisfies ΣPP=f1+f3+f4=17.49479 and f1/(f1+f3+f4)=0.20893, where ΣPP is a sum of the focal lengths fp of each lens with positive refractive power. It is helpful to share the positive refractive power of the first lens 110 to other positive lenses to avoid the significant aberration caused by the incident rays.

The optical image capturing system 10 of the first embodiment further satisfies ΣNP=f2+f5=−8.91038 mm; and f5/(f2+f5)=0.27127, where f2 is a focal length of the second lens 120, f5 is a focal length of the fifth lens 150, and ΣNP is a sum of the focal lengths fn of each lens with negative refractive power. It is helpful to share the negative refractive power of the fifth lens 150 to the other negative lens, which avoid the significant aberration caused by the incident rays.

The optical image capturing system 10 of the first embodiment further satisfies IN12=0.0384098 mm and IN12/f=0.01042, where IN12 is a distance on the optical axis between the first lens 110 and the second lens 120. It may correct chromatic aberration and improve the performance.

The optical image capturing system 10 of the first embodiment further satisfies IN45=0.158316 mm; IN45/f=0.04293, where IN45 is a distance on the optical axis between the fourth lens 140 and the fifth lens 150. It may correct chromatic aberration and improve the performance.

The optical image capturing system 10 of the first embodiment further satisfies TP1=0.61326 mm; TP2=0.3 mm; TP3=0.33333 mm; and (TP1+IN12)/TP2=2.17223, where TP1 is a central thickness of the first lens 110 on the optical axis, TP2 is a central thickness of the second lens 120 on the optical axis, and TP3 is a central thickness of the third lens 130 on the optical axis. It may control the sensitivity of manufacture of the system and improve the performance.

The optical image capturing system 10 of the first embodiment further satisfies TP4=0.47195 mm; TP5=0.50210 mm; and (TP5+IN45)/TP4=1.39935, where TP4 is a central thickness of the fourth lens 140 on the optical axis, TP5 is a central thickness of the fifth lens 150 on the optical axis, and IN45 is a distance on the optical axis between the fourth lens 140 and the fifth lens 150. It may control the sensitivity of manufacture of the system and lower the total height of the system.

The optical image capturing system 10 of the first embodiment further satisfies TP2/TP3=0.90002; TP3/TP4=0.70628; TP4/TP5=0.93995; and TP3/(IN23+TP3+IN34)=0.64903, where IN34 is a distance on the optical axis between the third lens 130 and the fourth lens 140. It may control the sensitivity of manufacture of the system and lower the total height of the system.

The optical image capturing system 10 of the first embodiment further satisfies InRS41=−0.3851 mm; InRS42=−0.586478 mm; |InRS41|/TP4=0.81598 and |InRS42|/TP4=1.24267, where InRS41 is a displacement in parallel with the optical axis from a point on the object-side surface 142 of the fourth lens, through which the optical axis passes, to a point at the maximum effective semi diameter of the object-side surface 142 of the fourth lens; InRS42 is a displacement in parallel with the optical axis from a point on the image-side surface 144 of the fourth lens, through which the optical axis passes, to a point at the maximum effective semi diameter of the image-side surface 144 of the fourth lens; and TP4 is a central thickness of the fourth lens 140 on the optical axis. It is helpful for manufacturing and shaping of the lenses and is helpful to reduce the size.

For the optical image capturing system 10 of the first embodiment, HVT41 a distance perpendicular to the optical axis between the critical point on the object-side surface 142 of the fourth lens and the optical axis; and HVT42 a distance perpendicular to the optical axis between the critical point on the image-side surface 144 of the fourth lens and the optical axis.

The optical image capturing system 10 of the first embodiment further satisfies InRS51=−0.204125 mm; InRS52=−0.111733 mm; |InRS51|/TP5=0.40654 and |InRS52|/TP5=0.22253, where InRS51 is a displacement in parallel with the optical axis from a point on the object-side surface 152 of the fifth lens, through which the optical axis passes, to a point at the maximum effective semi diameter of the object-side surface 152 of the fifth lens; InRS52 is a displacement in parallel with the optical axis from a point on the image-side surface 154 of the fifth lens, through which the optical axis passes, to a point at the maximum effective semi diameter of the image-side surface 154 of the fifth lens; and TP5 is a central thickness of the fifth lens 150 on the optical axis. It is helpful for manufacturing and shaping of the lenses and is helpful to reduce the size.

The optical image capturing system 10 of the first embodiment satisfies HVT51=0.512995 mm; HVT52=1.30753 mm; and HVT51/HVT52=0.3923, where HVT51 a distance perpendicular to the optical axis between the critical point on the object-side surface 152 of the fifth lens and the optical axis; and HVT52 a distance perpendicular to the optical axis between the critical point on the image-side surface 154 of the fifth lens and the optical axis.

The optical image capturing system 10 of the first embodiment satisfies HVT52/HOI=0.4457. It is helpful for correction of the aberration of the peripheral view field of the optical image capturing system.

The optical image capturing system 10 of the first embodiment satisfies HVT52/HOS=0.2919. It is helpful for correction of the aberration of the peripheral view field of the optical image capturing system.

The second lens 120, the third lens 130, and the fifth lens 150 have negative refractive power. The optical image capturing system 10 of the first embodiment further satisfies NA5/NA3=1, where NA3 is an Abbe number of the third lens 130; and NA5 is an Abbe number of the fifth lens 150. It may correct the aberration of the optical image capturing system.

The optical image capturing system 10 of the first embodiment further satisfies |TDT|=0.639157%; |ODT|=2.52459%, where TDT is TV distortion; and ODT is optical distortion.

For the optical image capturing system of the first embodiment, the values of MTF in a quarter of the spatial frequency (110 cycles/mm) at the optical axis, 0.3 field of view, and 0.7 field of view on an image plane are respectively denoted by MTFQ0, MTFQ3, and MTFQ7, wherein MTFQ0 is around 0.77, MTFQ3 is around 0.71, and MTFQ7 is around 0.65; the values of modulation transfer function (MTF) in half frequency (220 cycles/mm) at the optical axis, 0.3 field of view, and 0.7 field of view on an image plane are respectively denoted by MTFH0, MTFH3, and MTFH7, wherein MTFH0 is around 0.55, MTFH3 is around 0.47, and MTFH7 is around 0.36.

The parameters of the lenses of the first embodiment are listed in Table 1 and Table 2.

TABLE 1 f = 3.68765 mm; f/HEP = 2.05; HAF = 38 deg

| Surface | | Radius of curvature (mm) | Thickness (mm) | Material | Refractive index | Abbe number | Focal length (mm) |
|---|---|---|---|---|---|---|---|
| 0 | Object | plane | plane | | | | |
| 1 | Aperture/$1^{st}$ lens | 1.66171 | 0.613259 | Plastic | 1.5346 | 56.07 | 3.65523 |
| 2 | | 9.5 | 0.03841 | | | | |
| 3 | 2nd lens | 4.4103 | 0.3 | Plastic | 1.6425 | 22.465 | −6.4933 |
| 4 | | 2.09511 | 0.3 | | | | |
| 5 | $3^{rd}$ lens | 2.56592 | 0.333326 | Plastic | 1.5346 | 56.07 | 11.1432 |
| 6 | | 4.29241 | 0.502411 | | | | |
| 7 | $4^{th}$ lens | −2.11857 | 0.471949 | Plastic | 1.5346 | 56.07 | 2.69636 |
| 8 | | −0.92632 | 0.158316 | | | | |
| 9 | $5^{th}$ lens | 4.44003 | 0.502104 | Plastic | 1.5346 | 56.07 | −2.41708 |
| 10 | | 0.96379 | 0.3 | | | | |
| 11 | Infrared rays filter | plane | 0.21 | BK7_SCH | | | |
| 12 | | plane | 0.75168 | | | | |
| 13 | Image plane | plane | | | | | |

Reference wavelength: 555 nm; the position of blocking light: blocking at the first surface with effective semi diameter of 1.8 mm; blocking at the fourth surface with effective semi diameter of 1.7 mm.

TABLE 2

Coefficients of the aspheric surfaces

| Surface | 1 | 2 | 3 | 4 | 5 |
|---|---|---|---|---|---|
| k | −5.756495 | −37.40291 | −108.1256 | −10.028056 | −21.141348 |
| A4 | 1.38781E−01 | −2.38325E−01 | −1.20457E−01 | −9.87212E−03 | −7.40825E−03 |
| A6 | −9.83402E−02 | 6.48730E−01 | 5.22423E−01 | 2.85381E−01 | −1.42045E−01 |
| A8 | 1.48089E−02 | −7.05647E−01 | −3.87104E−01 | −3.14387E−01 | −2.18016E−01 |
| A10 | 1.15374E−01 | −8.69580E−01 | −1.10771E+00 | 1.71061E−01 | 1.13457E+00 |
| A12 | −3.13777E−01 | 2.52433E+00 | 2.35677E+00 | −1.72845E−01 | −1.93816E+00 |
| A14 | 3.46750E−01 | −2.06008E+00 | −1.64576E+00 | 3.16095E−01 | 1.52237E+00 |
| A16 | −2.20591E−01 | 5.87851E−01 | 4.02589E−01 | −1.66614E−01 | −4.32668E−01 |
| A18 | 5.85201E−02 | | | | |
| A20 | | | | | |

| Surface | 6 | 7 | 8 | 9 | 10 |
|---|---|---|---|---|---|
| k | 10.107969 | 1.254233 | −3.050304 | −8.22E+01 | −6.12E+00 |
| A4 | −6.56951E−02 | 2.04125E−01 | −2.73876E−02 | −1.99350E−01 | −1.38370E−01 |
| A6 | −8.49780E−02 | −6.07873E−01 | −1.42715E−01 | 1.72190E−01 | 1.04610E−01 |
| A8 | −1.53175E−01 | 2.13933E+00 | 5.28787E−01 | −1.52610E−01 | −6.87850E−02 |
| A10 | 4.25743E−01 | −5.07032E+00 | −8.67084E−01 | 1.07920E−01 | 3.27680E−02 |

TABLE 2-continued

| Coefficients of the aspheric surfaces | | | | | |
|---|---|---|---|---|---|
| A12 | −5.41369E−01 | 7.73531E+00 | 8.78194E−01 | −4.86280E−02 | −1.09030E−02 |
| A14 | 3.20124E−01 | −7.50886E+00 | −5.28366E−01 | 1.35410E−02 | 2.45390E−03 |
| A16 | −6.06884E−02 | 4.44245E+00 | 1.79522E−01 | −2.27510E−03 | −3.55330E−04 |
| A18 | | −1.44931E+00 | −3.14470E−02 | 2.12210E−04 | 2.98290E−05 |
| A20 | | 1.98717E−01 | 2.16525E−03 | −8.45910E−06 | −1.09730E−06 |

The detail parameters of the first embodiment are listed in Table 1, in which the unit of the radius of curvature, thickness, and focal length are millimeter, and surface 0-10 indicates the surfaces of all elements in the system in sequence from the object side to the image side. Table 2 is the list of coefficients of the aspheric surfaces, in which A1-A20 indicate the coefficients of aspheric surfaces from the first order to the twentieth order of each aspheric surface. The following embodiments have the similar diagrams and tables, which are the same as those of the first embodiment, so we do not describe it again.

Second Embodiment

Figure 2A:
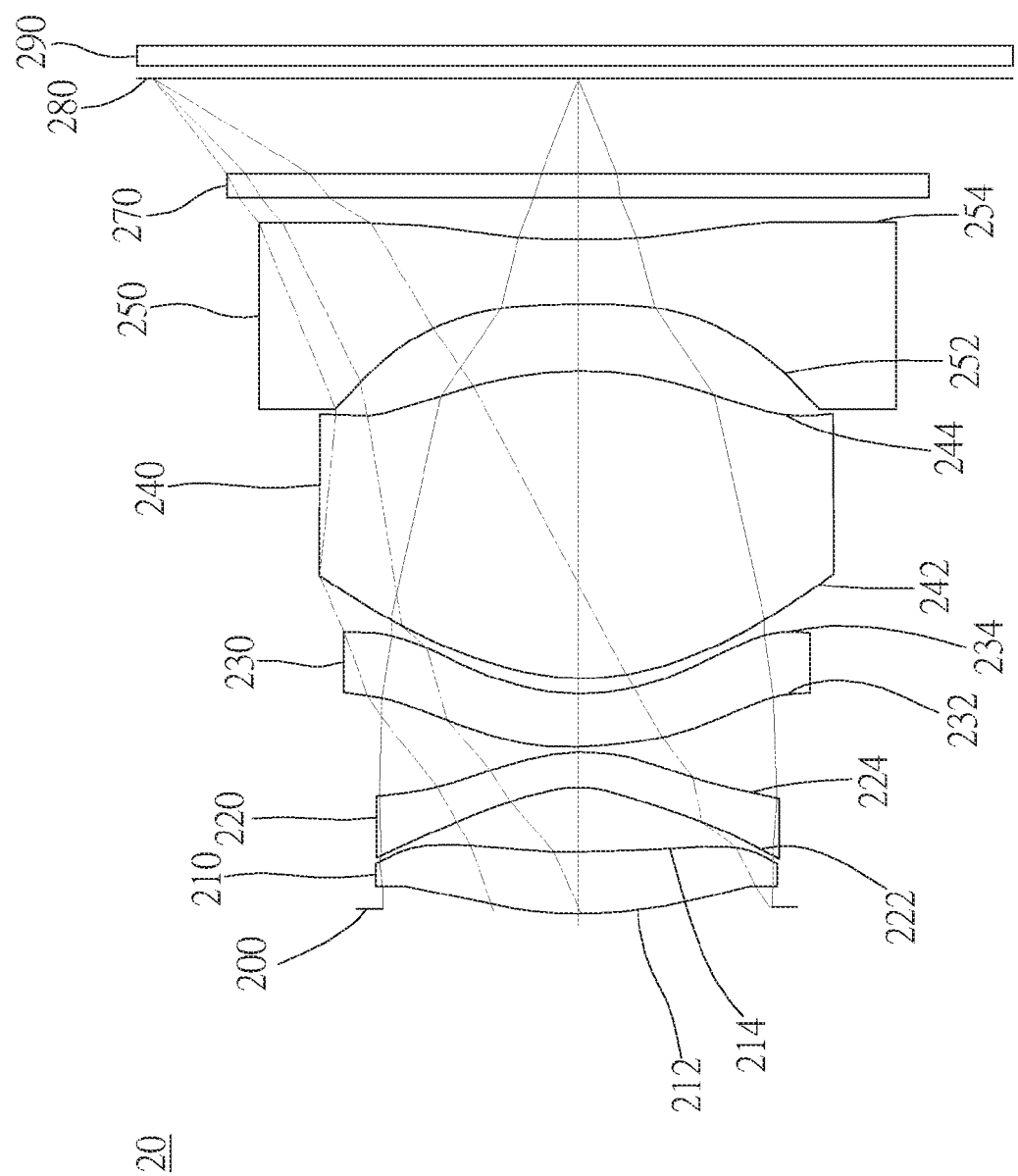
FIG. 2A is a schematic diagram of a second embodiment of the present invention.
Figure 2B:
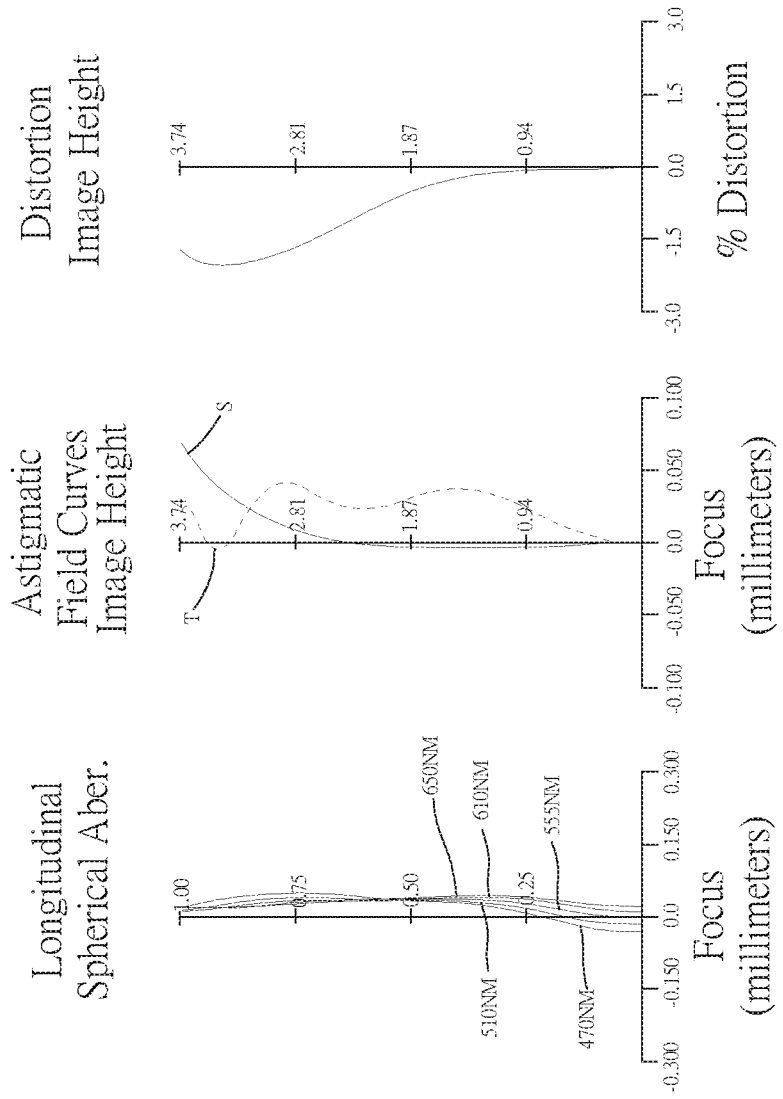
FIG. 2B shows curve diagrams of longitudinal spherical aberration, astigmatic field, and optical distortion of the optical image capturing system in the order from left to right of the second embodiment of the present application.
Figure 2C:
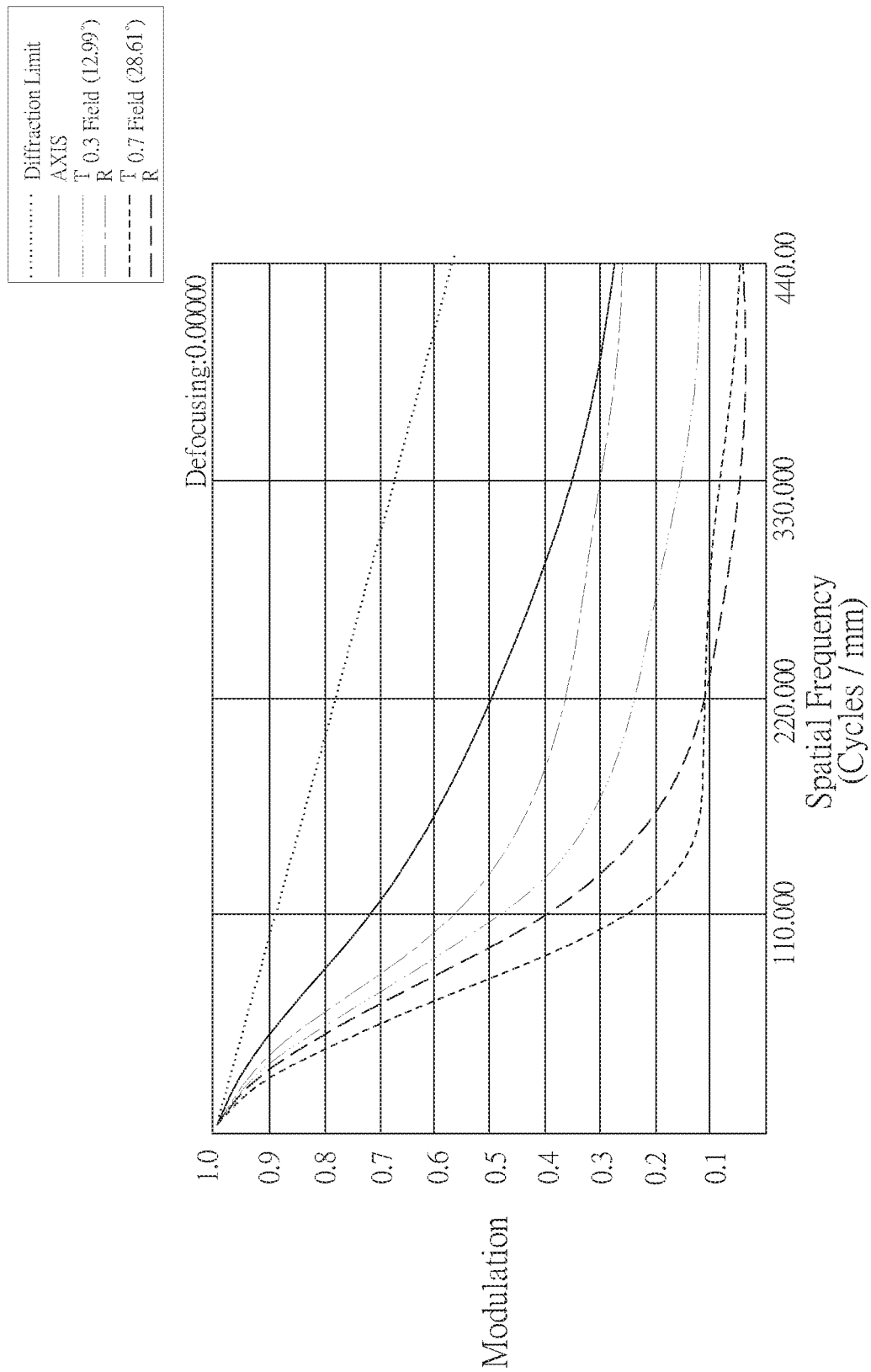
FIG. 2C shows a feature map of modulation transformation of the optical image capturing system of the second embodiment of the present application.

As shown in FIG. 2A and FIG. 2B, an optical image capturing system 20 of the second embodiment of the present invention includes, along an optical axis from an object side to an image side, an aperture 200, a first lens 210, a second lens 220, a third lens 230, a fourth lens 240, a fifth lens 250, an infrared rays filter 280, an image plane 290, and an image sensor 292. FIG. 2C shows a modulation transformation of the optical image capturing system 20 of the second embodiment of the present application.

The first lens 210 has positive refractive power and is made of plastic. An object-side surface 212 thereof, which faces the object side, is a convex aspheric surface, and an image-side surface 214 thereof, which faces the image side, is a concave aspheric surface. The object-side surface 212 and the image-side surface 214 both have an inflection point.

The second lens 220 has positive refractive power and is made of plastic. An object-side surface 222 thereof, which faces the object side, is a concave aspheric surface, and an image-side surface 224 thereof, which faces the image side, is a convex aspheric surface. The object-side surface 222 and the image-side surface 224 both have two inflection points.

The third lens 230 has negative refractive power and is made of plastic. An object-side surface 232, which faces the object side, is a convex aspheric surface, and an image-side surface 234, which faces the image side, is a concave aspheric surface. The object-side surface 232 and the image-side surface 234 both have an inflection point.

The fourth lens 240 has positive refractive power and is made of plastic. An object-side surface 242, which faces the object side, is a convex aspheric surface, and an image-side surface 244, which faces the image side, is a convex aspheric surface. The image-side surface 244 has an inflection point.

The fifth lens 250 has negative refractive power and is made of plastic. An object-side surface 252, which faces the object side, is a concave surface, and an image-side surface 254, which faces the image side, is a concave surface. It may help to shorten the back focal length to keep small in size. In addition, the image-side surface 254 has two inflection points, which may reduce an incident angle of the light of an off-axis field of view and correct the aberration of the off-axis field of view.

The infrared rays filter 280 is made of glass and between the fifth lens 250 and the image plane 290. The infrared rays filter 280 gives no contribution to the focal length of the system.

The optical image capturing system of the second embodiment satisfies |f2|+|f3|+|f4|=110.7339 mm; |f1|+|f5|=19.4268 mm; and |f2|+|f3|+|f4|>|f1|+|f5|, where f2 is a focal length of the second lens 220, f3 is a focal length of the third lens 230, f4 is a focal length of the fourth lens 240, and f5 is a focal length of the fifth lens 250.

In the second embodiment, the optical image capturing system of the second embodiment further satisfies ΣPP=118.70819 mm; and f1/ΣPP=0.13514, where ΣPP is a sum of the focal lengths of each positive lens. It is helpful to share the positive refractive power of the first lens 210 to other positive lenses to avoid the significant aberration caused by the incident rays.

The optical image capturing system of the second embodiment further satisfies ΣNP=−11.45249 mm; and f5/ΣNP=0.29549, where ΣNP is a sum of the focal lengths of each negative lens. It is helpful to share the negative refractive power of the fifth lens 250 to the other negative lens.

For the optical image capturing system of the second embodiment, the values of MTF in a quarter of the spatial frequency (110 cycles/mm) at the optical axis, 0.3 field of view, and 0.7 field of view on an image plane are respectively denoted by MTFQ0, MTFQ3, and MTFQ7, wherein MTFQ0 is around 0.73, MTFQ3 is around 0.49, and MTFQ7 is around 0.25; the values of modulation transfer function (MTF) in half frequency (220 cycles/mm) at the optical axis, 0.3 field of view, and 0.7 field of view on an image plane are respectively denoted by MTFH0, MTFH3, and MTFH7, wherein MTFH0 is around 0.5, MTFH3 is around 0.25, and MTFH7 is around 0.12.

The parameters of the lenses of the second embodiment are listed in Table 3 and Table 4.

TABLE 3

| f = 4.8328 mm; f/HEP = 1.4; HAF = 38.0002 deg | | | | | | |
|---|---|---|---|---|---|---|
| Surface | | Radius of curvature (mm) | Thickness (mm) | Material | Refractive index | Abbe number | Focal length (mm) |
| 0 | Object | plane | infinity | | | | |
| 1 | Aperture | plane | −0.034 | | | | |
| 2 | 1st lens | 3.433247182 | 0.550 | plastic | 1.565 | 58.00 | 16.043 |

TABLE 3-continued f = 4.8328 mm; f/HEP = 1.4; HAF = 38.0002 deg

| Surface | | Radius of curvature (mm) | Thickness (mm) | Material | Refractive index | Abbe number | Focal length (mm) |
|---|---|---|---|---|---|---|---|
| 3 | | 5.19625766 | 0.576 | | | | |
| 4 | $2^{nd}$ lens | −1.512665852 | 0.327 | plastic | 1.650 | 21.40 | 100.000 |
| 5 | | −1.605018141 | 0.050 | | | | |
| 6 | $3^{rd}$ lens | 2.361695079 | 0.492 | plastic | 1.583 | 30.20 | −8.068 |
| 7 | | 1.454093279 | 0.136 | | | | |
| 8 | $4^{th}$ lens | 2.150390914 | 2.745 | plastic | 1.565 | 58.00 | 2.665 |
| 9 | | −2.733412015 | 0.608 | | | | |
| 10 | $5^{th}$ lens | −4.265146638 | 0.559 | plastic | 1.607 | 26.60 | −3.384 |
| 11 | | 4.214297713 | 0.400 | | | | |
| 12 | Infrared rays filter | plane | 0.200 | | 1.517 | 64.13 | |
| 13 | | plane | 0.869 | | | | |
| 14 | Image plane | plane | | | | | |

Reference wavelength: 555 nm; the position of blocking light: blocking at the seventh surface with effective semi diameter of 2.050 mm.

TABLE 4

Coefficients of the aspheric surfaces

| Surface | 2 | 3 | 4 | 5 | 6 | 7 |
|---|---|---|---|---|---|---|
| k | −8.629475E+00 | −5.005119E+00 | −1.476027E+00 | −3.647437E+00 | −9.827019E+00 | −5.677896E+00 |
| A4 | 9.461341E−03 | −3.122262E−02 | 3.750494E−02 | 1.558045E−02 | 2.352323E−02 | −3.050577E−03 |
| A6 | −4.780743E−03 | 1.765010E−04 | 1.176840E−02 | 1.627703E−02 | −6.679090E−03 | 3.961915E−03 |
| A8 | −1.439673E−03 | −2.402534E−03 | −8.313273E−03 | −4.557360E−03 | 2.782409E−04 | −1.413547E−03 |
| A10 | 5.377027E−04 | 1.957850E−04 | 8.188345E−04 | −5.648085E−04 | 1.717272E−04 | −9.044427E−05 |
| A12 | −4.341801E−05 | 4.286351E−04 | 3.943149E−04 | 2.716994E−04 | −6.625468E−05 | 4.001175E−05 |
| A14 | −9.547468E−06 | −1.010978E−04 | −9.184088E−05 | −2.225498E−05 | 6.271686E−06 | −2.254974E−06 |

| Surface | 8 | 9 | 10 | 11 |
|---|---|---|---|---|
| k | −4.408132E+00 | 1.624895E−01 | 5.298814E−01 | −1.447627E+01 |
| A4 | 3.536567E−03 | 3.209521E−02 | −1.421260E−02 | −1.450157E−02 |
| A6 | 1.877852E−03 | −4.385547E−03 | −2.113269E−03 | 1.618741E−03 |
| A8 | −4.159789E−05 | 9.147872E−04 | 1.633603E−04 | −5.561153E−05 |
| A10 | −1.481684E−04 | 7.376192E−05 | 1.193678E−04 | −6.470200E−06 |
| A12 | 2.979371E−05 | −3.382297E−06 | −2.147520E−05 | 1.160055E−06 |
| A14 | −1.619843E−06 | −1.730860E−06 | 3.841447E−07 | −5.583501E−08 |

An equation of the aspheric surfaces of the second embodiment is the same as that of the first embodiment, and the definitions are the same as well.

The exact parameters of the second embodiment based on Table 3 and Table 4 are listed in the following table:

Second embodiment (Reference wavelength: 555 nm)

| ETP1 | ETP2 | ETP3 | ETP4 | ETP5 | BL |
|---|---|---|---|---|---|
| 0.244 | 0.533 | 0.573 | 1.811 | 1.250 | 1.469 |

| ETP1/TP1 | ETP2/TP2 | ETP3/TP3 | ETP4/TP4 | ETP5/TP5 | EBL/BL |
|---|---|---|---|---|---|
| 0.443 | 1.630 | 1.164 | 0.660 | 2.235 | 0.8904 |

| ETL | EBL | EIN | EIR | PIR | EIN/ETL |
|---|---|---|---|---|---|
| 7.272 | 1.308 | 5.964 | 0.239 | 0.400 | 0.820 |

| SETP/EIN | EIR/PIR | SETP | STP | SETP/STP | SED/SIN |
|---|---|---|---|---|---|
| 0.739 | 0.598 | 4.410 | 4.673 | 0.944 | 1.134 |

Second embodiment (Reference wavelength: 555 nm)

| ED12 | ED23 | ED34 | ED45 | SED | SIN |
|---|---|---|---|---|---|
| 0.041 | 0.878 | 0.180 | 0.455 | 1.554 | 1.370 |

| ED12/IN12 | ED23/IN23 | ED34/IN34 | ED45/IN45 | | |
|---|---|---|---|---|---|
| 0.071 | 17.560 | 1.319 | 0.749 | | |

| |f/f1| | |f/f2| | |f/f3| | |f/f4| | |f/f5| | |f1/f2| |
|---|---|---|---|---|---|
| 0.30125 | 0.04833 | 0.59898 | 1.81310 | 1.42809 | 0.16043 |

| ΣPPR | ΣNPR | ΣPPR/|ΣNPR| | IN12/f | IN45/f | |f2/f3| |
|---|---|---|---|---|---|
| 2.16268 | 2.02707 | 1.06690 | 0.11914 | 0.12583 | 12.39405 |

| TP3/(IN23 + TP3 + IN34) | (TP1 + IN12)/TP2 | (TP5 + IN45)/TP4 |
|---|---|---|
| 0.72532 | 3.44520 | 0.42522 |

-continued

| Second embodiment (Reference wavelength: 555 nm) | | | | | |
|---|---|---|---|---|---|
| HOS | InTL | HOS/HOI | InS/HOS | \|ODT\|% | \|TDT\|% |
| 7.51256 | 6.04356 | 2.00871 | 0.99546 | −2.01693 | 1.11234 |
| HVT41 | HVI42 | HVT51 | HVT52 | HVT52/HOI | HVT52/HOS |
| 0.00000 | 1.97503 | 0.00000 | 2.13691 | 0.00000 | 0.00000 |
| TP2/TP3 | TP3/TP4 | InRS51 | InRS52 | \|InRS51\|/TP5 | \|InRS52\|/TP5 |
| 0.66426 | 0.17922 | −0.951979 | 0.166359 | 1.70235 | 0.29749 |

The results of the equations of the second embodiment based on Table 3 and Table 4 are listed in the following table:

| Values related to the inflection points of the second embodiment (Reference wavelength: 555 nM) | | | | | | |
|---|---|---|---|---|---|---|
| HIF111 | 1.08878 | HIF111/HOI | 0.29112 | SGI111 | 0.15183 | \|SGI111\|/(\|SGI111\| + TP1) 0.21628 |
| HIF121 | 0.66531 | HIF121/HOI | 0.17789 | SGI121 | 0.03573 | \|SGI121\|/(\|SGI121\| + TP1) 0.06098 |
| HIF211 | 1.08840 | HIF211/HOI | 0.29102 | SGI211 | −0.31150 | \|SGI211\|/(\|SGI211\| + TP2) 0.48801 |
| HIF212 | 1.37547 | HIF212/HOI | 0.36777 | SGI212 | −0.43620 | \|SGI212\|/(\|SGI212\| + TP2) 0.57168 |
| HIF221 | 0.83704 | HIF221/HOI | 0.22381 | SGI221 | −0.17677 | \|SGI221\|/(\|SGI221\| + TP2) 0.35103 |
| HIF222 | 1.56518 | HIF222/HOI | 0.41850 | SGI222 | −0.36502 | \|SGI222\|/(\|SGI222\| + TP2) 0.52762 |
| HIF311 | 1.39099 | HIF311/HOI | 0.37192 | SGI311 | 0.31709 | \|SGI311\|/(\|SGI311\| + TP3) 0.39191 |
| HIF321 | 1.24837 | HIF321/HOI | 0.33379 | SGI321 | 0.34367 | \|SGI321\|/(\|SGI321\| + TP3) 0.41126 |
| HIF421 | 1.32014 | HIF421/HOI | 0.35298 | SGI421 | −0.26023 | \|SGI421\|/(\|SGI421\| + TP4) 0.08659 |
| HIF521 | 0.91420 | HIF521/HOI | 0.24444 | SGI521 | 0.07783 | \|SGI521\|/(\|SGI521\| + TP5) 0.12217 |
| HIF522 | 2.42121 | HIF522/HOI | 0.64738 | SGI522 | 0.16829 | \|SGI522\|/(\|SGI522\| + TP5) 0.23132 |

Third Embodiment

Figure 3A:
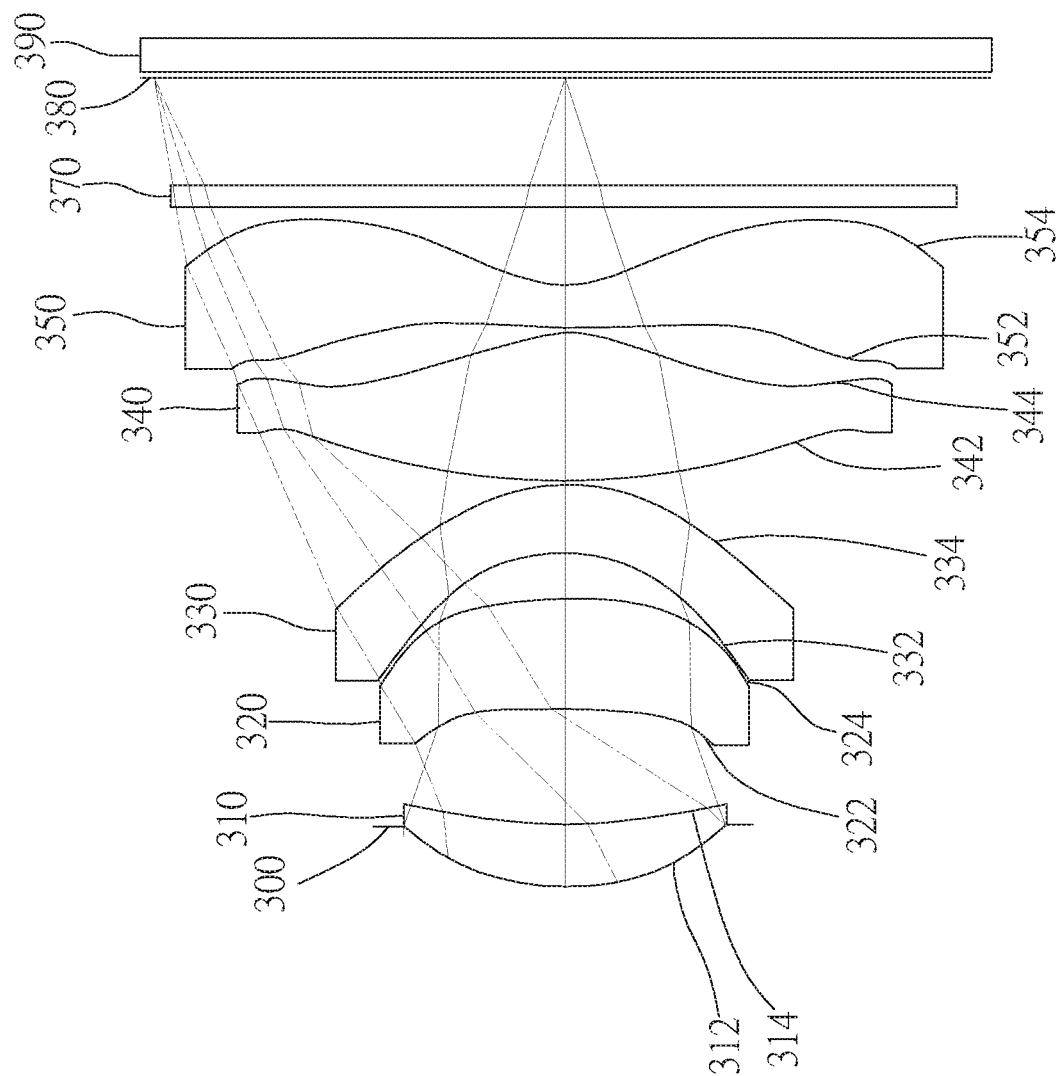
FIG. 3A is a schematic diagram of a third embodiment of the present invention.
Figure 3B:
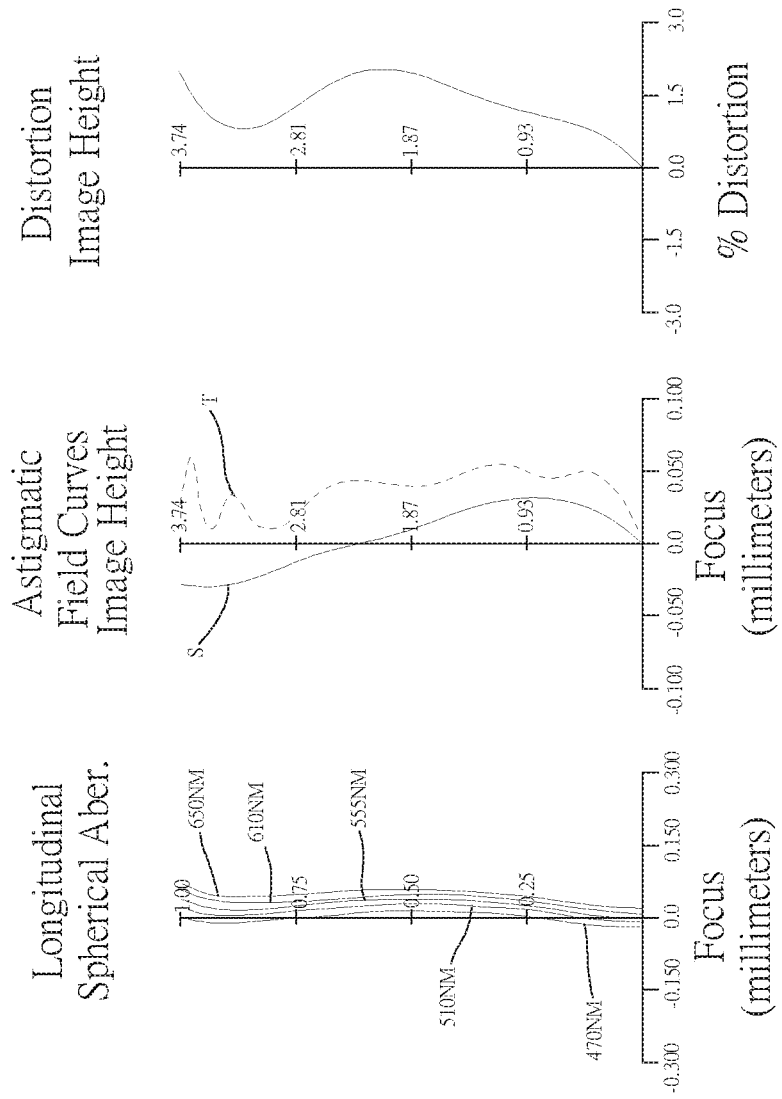
FIG. 3B shows curve diagrams of longitudinal spherical aberration, astigmatic field, and optical distortion of the optical image capturing system in the order from left to right of the third embodiment of the present application.
Figure 3C:
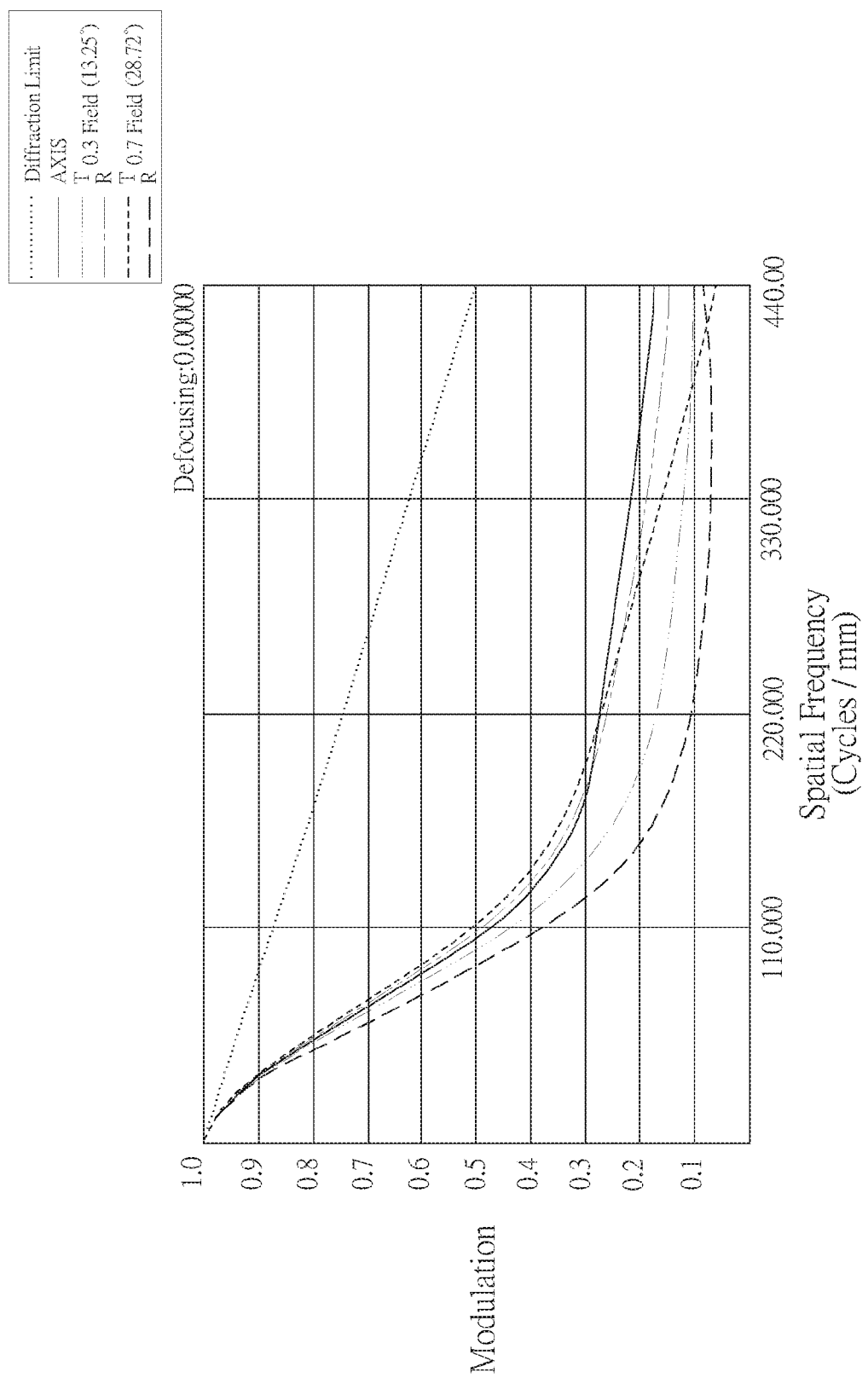
FIG. 3C shows a feature map of modulation transformation of the optical image capturing system of the third embodiment of the present application.

As shown in FIG. 3A and FIG. 3B, an optical image capturing system of the third embodiment of the present invention includes, along an optical axis from an object side to an image side, an aperture 300, a first lens 310, a second lens 320, a third lens 330, a fourth lens 340, a fifth lens 350, an infrared rays filter 380, an image plane 390, and an image sensor 392. FIG. 3C shows a modulation transformation of the optical image capturing system 30 of the third embodiment of the present application.

The first lens 310 has positive refractive power and is made of plastic. An object-side surface 312 thereof, which faces the object side, is a convex aspheric surface, and an image-side surface 314 thereof, which faces the image side, is a concave aspheric surface.

The second lens 320 has positive refractive power and is made of plastic. An object-side surface 322 thereof, which faces the object side, is a concave aspheric surface, and an image-side surface 324 thereof, which faces the image side, is a convex aspheric surface.

The third lens 330 has negative refractive power and is made of plastic. An object-side surface 332 thereof, which faces the object side, is a concave surface, and an image-side surface 334 thereof, which faces the image side, is a convex aspheric surface. The image-side surface 334 has an inflection point.

The fourth lens 340 has positive refractive power and is made of plastic. An object-side surface 342, which faces the object side, is a convex aspheric surface, and an image-side surface 344, which faces the image side, is a convex aspheric surface. The object-side surface 342 has an inflection point, and the image-side surface 344 has two inflection points.

The fifth lens 350 has negative refractive power and is made of plastic. An object-side surface 352, which faces the object side, is a convex surface, and an image-side surface 354, which faces the image side, is a concave surface. It may help to shorten the back focal length to keep small in size. In addition, the object-side surface 352 has three inflection points, and the image-side surface 354 has an inflection point, which may reduce an incident angle of the light of an off-axis field of view and correct the aberration of the off-axis field of view.

The infrared rays filter 380 is made of glass and between the fifth lens 350 and the image plane 390. The infrared rays filter 390 gives no contribution to the focal length of the system.

The optical image capturing system of the second embodiment satisfies $|f2|+|f3|+|f4|=91.6486$ mm; $|f1|+|f5|=8.4748$ mm; and $|f2|+|f3|+|f4|>|f1|+|f5|$, where f2 is a focal length of the second lens 320, f3 is a focal length of the third lens 330, f4 is a focal length of the fourth lens 340, and f5 is a focal length of the fifth lens 350.

In the third embodiment, the optical image capturing system of the third embodiment further satisfies $\Sigma PP=34.55259$ mm; and $f1/\Sigma PP=0.19468$ mm, where $\Sigma PP$ is a sum of the focal lengths of each positive lens. It is helpful to share the positive refractive power of the first lens 310 to other positive lenses to avoid the significant aberration caused by the incident rays.

The optical image capturing system of the third embodiment further satisfies $\Sigma NP=-65.57082$ mm; and $f5/\Sigma NP=0.02666$, where $\Sigma NP$ is a sum of the focal lengths of each negative lens. It is helpful to share the negative refractive power of the fifth lens 350 to the other negative lens.

For the optical image capturing system of the third embodiment, the values of MTF in a quarter of the spatial frequency (110 cycles/mm) at the optical axis, 0.3 field of view, and 0.7 field of view on an image plane are respectively denoted by MTFQ0, MTFQ3, and MTFQ7, wherein MTFQ0 is around 0.47, MTFQ3 is around 0.44, and MTFQ7 is around 0.5; the values of modulation transfer function (MTF) in half frequency (220 cycles/mm) at the optical axis, 0.3 field of view, and 0.7 field of view on an image plane are respectively denoted by MTFH0, MTFH3, and MTFH7, wherein MTFH0 is around 0.27, MTFH3 is around 0.17, and MTFH7 is around 0.27.

The parameters of the lenses of the third embodiment are listed in Table 5 and Table 6.

TABLE 5 f = 4.68276 mm; f/HEP = 1.6; HAF = 38.0001 deg;

| Surface | | Radius of curvature (mm) | Thickness (mm) | Material | Refractive index | Abbe number | Focal length (mm) |
|---|---|---|---|---|---|---|---|
| 0 | Object | plane | infinity | | | | |
| 1 | Aperture | plane | −0.517 | | | | |
| 2 | 1st lens | 2.566209311 | 0.543 | plastic | 1.565 | 58.00 | 6.727 |
| 3 | | 7.248293317 | 1.054 | | | | |
| 4 | 2nd lens | −8.098724094 | 0.989 | plastic | 1.565 | 58.00 | 25.883 |
| 5 | | −5.448609954 | 0.433 | | | | |
| 6 | 3rd lens | −1.389451489 | 0.618 | plastic | 1.650 | 21.40 | −63.823 |
| 7 | | −1.690393677 | 0.050 | | | | |
| 8 | 4th lens | 7.364239171 | 1.332 | plastic | 1.565 | 58.00 | 1.942 |
| 9 | | −1.20965837 | 0.050 | | | | |
| 10 | 5th lens | 9.732752744 | 0.396 | plastic | 1.583 | 30.20 | −1.748 |
| 11 | | 0.913492312 | 0.700 | | | | |
| 12 | Infrared rays filter | plane | 0.200 | | 1.517 | 64.13 | |
| 13 | | plane | 0.981 | | | | |
| 14 | Image plane | plane | | | | | |

Reference wavelength: 555 nm; the position of blocking light: blocking at the fourth surface with effective semi diameter of 1.350 nm.

TABLE 6

Coefficients of the aspheric surfaces

| Surface | 2 | 3 | 4 | 5 | 6 | 7 |
|---|---|---|---|---|---|---|
| k | −2.047317E−01 | 4.976194E+00 | 1.628504E+01 | 2.916522E+00 | −4.301318E−01 | −7.389748E−01 |
| A4 | 8.350923E−03 | 6.349848E−03 | −3.490800E−02 | −4.218460E−02 | 5.430834E−03 | 1.317501E−02 |
| A6 | 3.546306E−03 | −3.631254E−03 | 4.748019E−03 | −7.185741E−04 | 1.721578E−02 | 1.540447E−04 |
| A8 | −2.081995E−03 | 6.230267E−03 | −1.222625E−02 | −7.210672E−04 | −7.284993E−03 | 6.356410E−04 |
| A10 | 2.673453E−03 | −4.332645E−03 | 3.745389E−03 | −2.847380E−03 | 5.949785E−04 | −1.239010E−04 |
| A12 | −1.175099E−03 | 1.651672E−03 | 4.951494E−04 | 1.083082E−03 | 3.737567E−04 | −1.643699E−05 |
| A14 | 2.530313E−04 | −2.432573E−04 | −8.546436E−04 | −8.900342E−05 | 2.396690E−05 | 4.496746E−06 |

| Surface | 8 | 9 | 10 | 11 |
|---|---|---|---|---|
| k | 5.370615E+00 | −8.910096E+00 | −5.000000E+01 | −5.616003E+00 |
| A4 | 2.372978E−04 | 3.116258E−03 | −1.962551E−02 | −1.366378E−02 |
| A6 | −3.997454E−04 | 4.988984E−04 | 6.795314E−04 | 8.067958E−04 |
| A8 | 4.189780E−05 | 4.890759E−05 | −9.492932E−07 | −5.750768E−05 |
| A10 | 6.180707E−06 | 1.817068E−05 | 3.563757E−06 | −1.228612E−06 |
| A12 | −2.407855E−06 | −3.928346E−06 | 4.354574E−06 | 7.217204E−07 |
| A14 | −9.851550E−09 | 1.084529E−07 | −4.277470E−07 | −3.851781E−08 |

An equation of the aspheric surfaces of the third embodiment is the same as that of the first embodiment, and the definitions are the same as well.

The exact parameters of the third embodiment based on Table 5 and Table 6 are listed in the following table:

Third embodiment (Reference wavelength: 555 nm)

| ETP1 | ETP2 | ETP3 | ETP4 | ETP5 | BL |
|---|---|---|---|---|---|
| 0.203 | 1.008 | 0.870 | 0.810 | 0.845 | 1.8813 |

| ETP1/TP1 | ETP2/TP2 | ETP3/TP3 | ETP4/TP4 | ETP5/TP5 | EBL/BL |
|---|---|---|---|---|---|
| 0.373 | 1.020 | 1.408 | 0.608 | 2.133 | 0.75799 |

| ETL | EBL | EIN | EIR | PIR | EIN/ETL |
|---|---|---|---|---|---|
| 6.811 | 1.426 | 5.385 | 0.245 | 0.700 | 0.791 |

Third embodiment (Reference wavelength: 555 nm)

| SETP/EIN | EIR/PIR | SETP | STP | SETP/STP | SED/SIN |
|---|---|---|---|---|---|
| 0.694 | 0.349 | 3.736 | 3.879 | 0.963 | 1.039 |

| ED12 | ED23 | ED34 | ED45 | SED | SIN |
|---|---|---|---|---|---|
| 0.368 | 0.053 | 0.803 | 0.426 | 1.649 | 1.587 |

| ED12/IN12 | ED23/IN23 | ED34/IN34 | ED45/IN45 |
|---|---|---|---|
| 0.349 | 0.123 | 16.056 | 8.512 |

| |f/f1| | |f/f2| | |f/f3| | |f/f4| | |f/f5| | |f1/f2| |
|---|---|---|---|---|---|
| 0.69613 | 0.18092 | 0.07337 | 2.41090 | 2.67905 | 0.25989 |

-continued

Third embodiment (Reference wavelength: 555 nm)

| ΣPPR | ΣNPR | ΣPPR/|ΣNPR| | IN12/f | IN45/f | |f2/f3| |
|---|---|---|---|---|---|
| 3.28794 | 2.75242 | 1.19457 | 0.22507 | 0.01068 | 0.40555 |

| TP3/(IN23 + TP3 + IN34) | (TP1 + IN12)/TP2 | (TP5 + IN45)/TP4 |
|---|---|---|
| 0.56122 | 1.61493 | 0.33474 |

| HOS | InTL | HOS/HOI | InS/HOS | |ODT|% | |TDT|% |
|---|---|---|---|---|---|
| 7.34768 | 5.46638 | 1.96462 | 0.92963 | 2.02282 | 1.16962 |

| HVT41 | HVT42 | HVT51 | HVT52 | HVT52/HOI | HVT52/HOS |
|---|---|---|---|---|---|
| 2.61049 | 2.16302 | 1.05292 | 2.26183 | 0.28153 | 0.14330 |

| TP2/TP3 | TP3/TP4 | InRS51 | InRS52 | |InRS51|/TP5 | |InRS52|/TP5 |
|---|---|---|---|---|---|
| 1.59979 | 0.46407 | −0.361678 | 0.156317 | 0.91340 | 0.39477 |

The results of the equations of the third embodiment based on Table 5 and Table 6 are listed in the following table:

Values related to the inflection points of the third embodiment
(Reference wavelength: 555 nM)

| HIF321 | 1.97623 | HIF321/HOI | 0.52840 | SGI321 | −1.03269 | |SGI321|/(|SGI321| + TP3) | 0.62551 |
|---|---|---|---|---|---|---|---|
| HIF411 | 2.14543 | HIF411/HOI | 0.57364 | SGI411 | 0.34684 | |SGI411|/(|SGI411| + TP4) | 0.20656 |
| HIF421 | 0.98184 | HIF421/HOI | 0.26252 | SGI421 | −0.22480 | |SGI421|/(|SGI421| + TP4) | 0.14437 |
| HIF422 | 2.55283 | HIF422/HOI | 0.68257 | SGI422 | −0.44229 | |SGI422|/(|SGI422| + TP4) | 0.24915 |
| HIF511 | 0.59189 | HIF511/HOI | 0.15826 | SGI511 | 0.01487 | |SGI511|/(|SGI511| + TP5) | 0.03619 |
| HIF512 | 2.17360 | HIF512/HOI | 0.58118 | SGI512 | −0.16256 | |SGI512|/(|SGI512| + TP5) | 0.29104 |
| HIF513 | 2.75873 | HIF513/HOI | 0.73763 | SGI513 | −0.29309 | |SGI513|/(|SGI513| + TP5) | 0.42535 |
| HIF521 | 0.83228 | HIF521/HOI | 0.22253 | SGI521 | 0.23080 | |SGI521|/(|SGI521| + TP5) | 0.36824 |

Fourth Embodiment

Figure 4A:
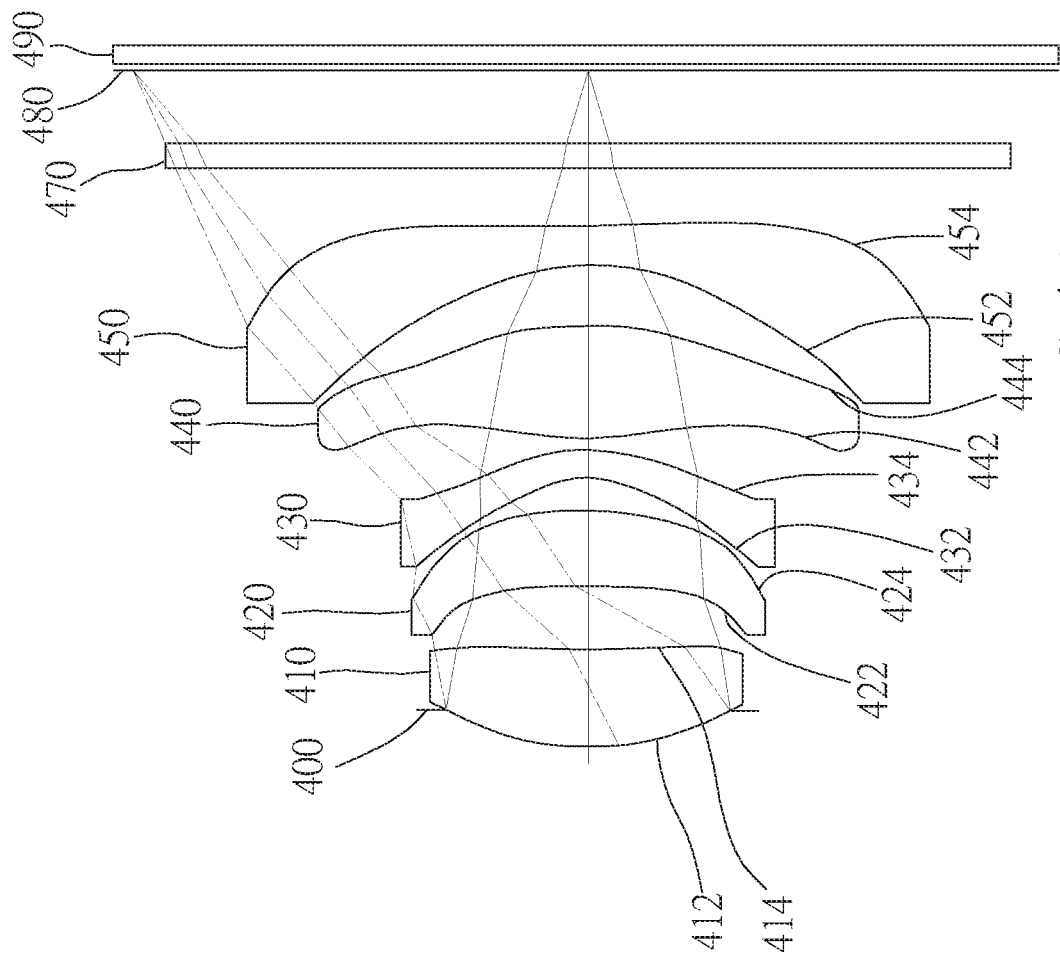
FIG. 4A is a schematic diagram of a fourth embodiment of the present invention.
Figure 4B:
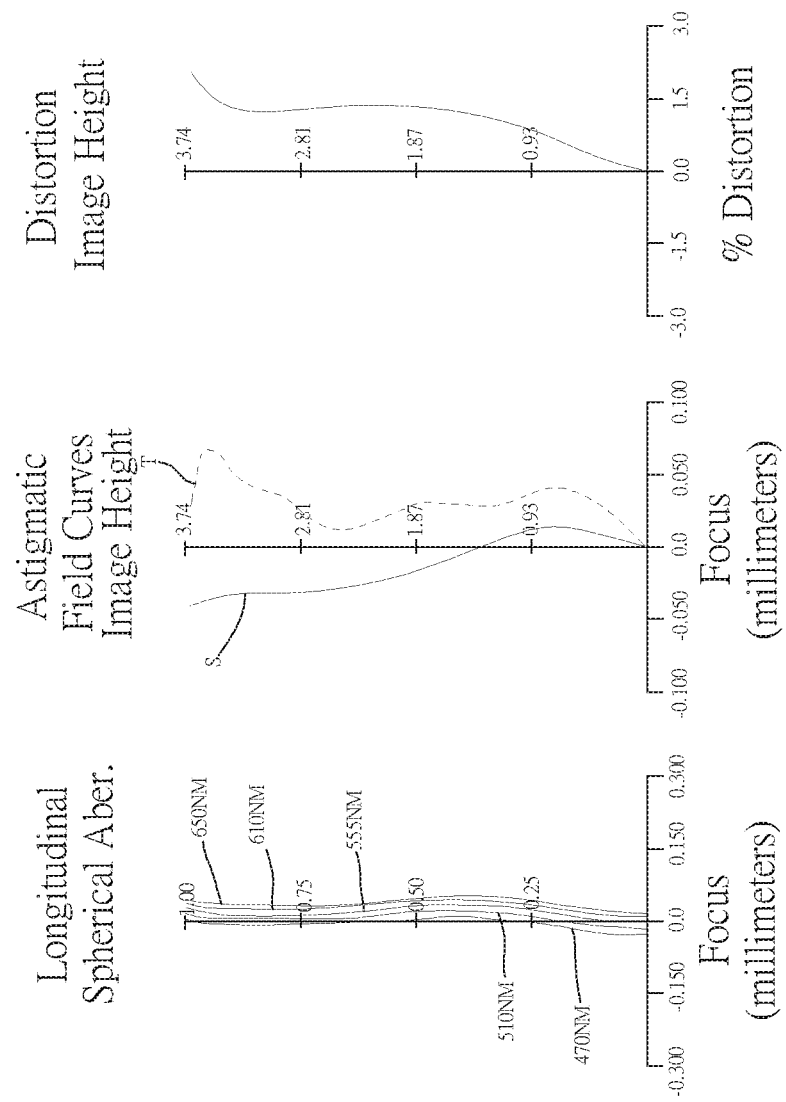
FIG. 4B shows curve diagrams of longitudinal spherical aberration, astigmatic field, and optical distortion of the optical image capturing system in the order from left to right of the fourth embodiment of the present application.
Figure 4C:
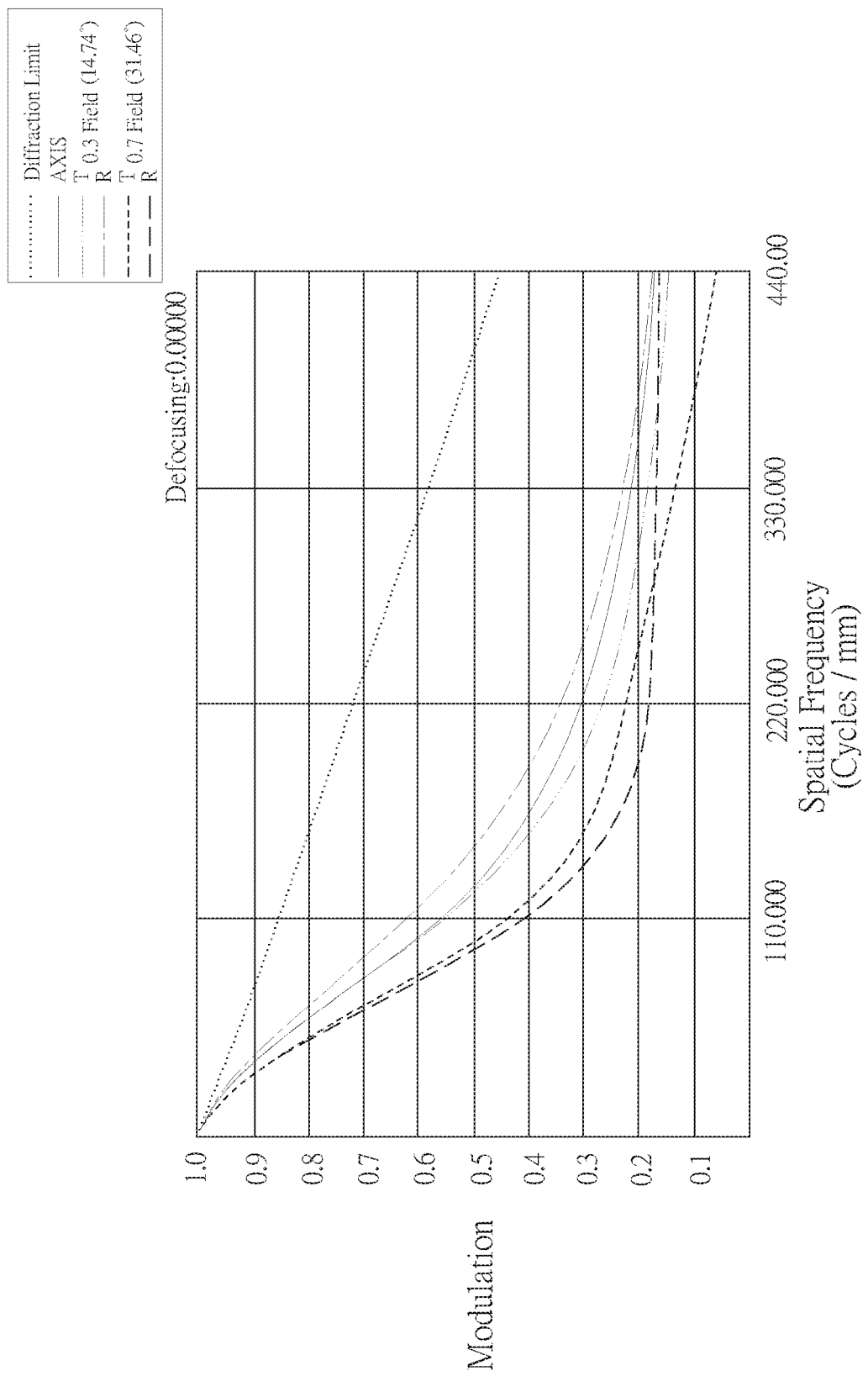
FIG. 4C shows a feature map of modulation transformation of the optical image capturing system of the fourth embodiment.

As shown in FIG. 4A and FIG. 4B, an optical image capturing system 40 of the fourth embodiment of the present invention includes, along an optical axis from an object side to an image side, an aperture 400, a first lens 410, a second lens 420, a third lens 430, a fourth lens 440, a fifth lens 450, an infrared rays filter 480, an image plane 490, and an image sensor 492. FIG. 4C shows a modulation transformation of the optical image capturing system 40 of the fourth embodiment of the present application.

The first lens 410 has positive refractive power and is made of plastic. An object-side surface 412 thereof, which faces the object side, is a convex aspheric surface, and an image-side surface 414 thereof, which faces the image side, is a concave aspheric surface. The object-side surface 412 has an inflection point, and the image-side surface 414 has two inflection points.

The second lens 420 has positive refractive power and is made of plastic. An object-side surface 422 thereof, which faces the object side, is a concave aspheric surface, and an image-side surface 424 thereof, which faces the image side, is a convex aspheric surface.

The third lens 430 has negative refractive power and is made of plastic. An object-side surface 432 thereof, which faces the object side, is a concave aspheric surface, and an image-side surface 434 thereof, which faces the image side, is a convex aspheric surface. The object-side surface 432 and the image-side surface 434 both have an inflection point.

The fourth lens 440 has positive refractive power and is made of plastic. An object-side surface 442, which faces the object side, is a convex aspheric surface, and an image-side surface 444, which faces the image side, is a convex aspheric surface. The object-side surface 442 and the image-side surface 444 both have two inflection points.

The fifth lens 450 has negative refractive power and is made of plastic. An object-side surface 452, which faces the object side, is a concave surface, and an image-side surface 454, which faces the image side, is a concave surface. It may help to shorten the back focal length to keep small in size. In addition, the object-side surface 452 has two inflection points, and the image-side surface 454 has an inflection point, which may reduce an incident angle of the light of an off-axis field of view and correct the aberration of the off-axis field of view.

The infrared rays filter 480 is made of glass and between the fifth lens 450 and the image plane 490. The infrared rays filter 480 gives no contribution to the focal length of the system.

The optical image capturing system of the second embodiment satisfies |f2|+|f3|+|f4|=13.4727 mm; |f1|+|f5|=8.1550 mm; and |f2|+|f3|+|f4|>|f1|+|f5|, where f2 is a focal length of the second lens 420, f3 is a focal length of the third lens 430, f4 is a focal length of the fourth lens 440, and f5 is a focal length of the fifth lens 450.

In the fourth embodiment, the optical image capturing system of the fourth embodiment further satisfies ΣPP=15.01629 mm; and f1/ΣPP=0.34444, where ΣPP is a sum of the focal lengths of each positive lens. It is helpful to share the positive refractive power of the first lens 410 to other positive lenses to avoid the significant aberration caused by the incident rays.

The optical image capturing system of the fourth embodiment further satisfies ΣNP=−6.61138 mm; and f5/ΣNP=0.45116, where ΣNP is a sum of the focal lengths of each negative lens. It is helpful to share the negative refractive power of the fifth lens 450 to the other negative lens.

For the optical image capturing system of the fourth embodiment, the values of MTF in a quarter of the spatial frequency (110 cycles/mm) at the optical axis, 0.3 field of view, and 0.7 field of view on an image plane are respectively denoted by MTFQ0, MTFQ3, and MTFQ7, wherein MTFQ0 is around 0.56, MTFQ3 is around 0.56, and MTFQ7 is around 0.45; the values of modulation transfer function (MTF) in half frequency (220 cycles/mm) at the optical axis, 0.3 field of view, and 0.7 field of view on an image plane are respectively denoted by MTFH0, MTFH3, and MTFH7, wherein MTFH0 is around 0.31, MTFH3 is around 0.26, and MTFH7 is around 0.23.

The parameters of the lenses of the fourth embodiment are listed in Table 7 and Table 8.

TABLE 7 f = 4.202 mm; f/HEP = 1.8; HAF = 41 deg

| Surface | | Radius of curvature (mm) | Thickness (mm) | Material | Refractive index | Abbe number | Focal length (mm) |
|---|---|---|---|---|---|---|---|
| 0 | Object | plane | infinity | | | | |
| 1 | Aperture | plane | −0.300 | | | | |
| 2 | 1$^{st}$ lens | 2.265839504 | 0.808 | plastic | 1.565 | 58.00 | 5.172 |
| 3 | | 8.690860795 | 0.527 | | | | |
| 4 | 2$^{nd}$ lens | −14.22889489 | 0.631 | plastic | 1.565 | 58.00 | 7.431 |
| 5 | | −3.30202588 | 0.271 | | | | |
| 6 | 3$^{rd}$ lens | −0.74193412 | 0.248 | plastic | 1.650 | 21.40 | −3.629 |
| 7 | | −1.22118858 | 0.095 | | | | |
| 8 | 4$^{th}$ lens | 2.525585268 | 0.942 | plastic | 1.583 | 30.20 | 2.413 |
| 9 | | −2.774548403 | 0.496 | | | | |
| 10 | 5$^{th}$ lens | −1.98119395 | 0.330 | plastic | 1.583 | 30.20 | −2.983 |
| 11 | | 15.86829171 | 0.500 | | | | |
| 12 | Infrared rays filter | plane | 0.200 | | 1.517 | 64.13 | |
| 13 | | plane | 0.611 | | | | |
| 14 | Image plane | plane | | | | | |

Reference wavelength: 555 nm.

TABLE 8

Coefficients of the aspheric surfaces

| Surface | 2 | 3 | 4 | 5 | 6 | 7 |
|---|---|---|---|---|---|---|
| k | −4.728787E+00 | 4.222615E+01 | 5.000000E+01 | 3.764382E+00 | −2.910285E+00 | −4.123579E+00 |
| A4 | 4.392605E−02 | −2.062158E−02 | −5.859873E−02 | −3.316115E−02 | −5.589003E−03 | 1.456808E−02 |
| A6 | −6.333093E−03 | −2.351065E−02 | −1.252445E−02 | −1.118568E−02 | 6.168325E−03 | 1.274874E−03 |
| A8 | −7.441343E−03 | 6.071074E−03 | −2.374130E−02 | −6.947542E−04 | −3.262817E−03 | 4.514663E−04 |
| A10 | 3.548797E−03 | −2.670973E−03 | 6.261608E−03 | −1.500384E−04 | −2.666052E−03 | −1.264821E−03 |
| A12 | 8.326414E−04 | −4.372711E−03 | 4.237196E−03 | 1.009977E−04 | −1.629242E−04 | −1.529002E−04 |
| A14 | −1.256193E−03 | 1.537586E−03 | −3.182012E−03 | −5.282669E−05 | 5.814220E−04 | 3.704809E−04 |

| Surface | 8 | 9 | 10 | 11 |
|---|---|---|---|---|
| k | −2.904585E+01 | −1.199052E+00 | −5.274462E−01 | 7.326749E+00 |
| A4 | −2.741635E−02 | 2.313903E−03 | 1.518794E−02 | −1.469343E−02 |
| A6 | 2.952490E−03 | 2.012551E−04 | −2.417287E−03 | 2.200914E−04 |
| A8 | 1.535417E−04 | 1.209695E−03 | 6.902244E−04 | −3.833093E−05 |
| A10 | −2.137910E−04 | 7.308202E−06 | 1.230465E−04 | 2.764342E−06 |
| A12 | −1.109131E−04 | −7.127287E−05 | −1.462315E−06 | 4.286407E−08 |
| A14 | 3.017712E−05 | 5.157536E−06 | −5.829476E−06 | −1.415128E−07 |

An equation of the aspheric surfaces of the fourth embodiment is the same as that of the first embodiment, and the definitions are the same as well.

The exact parameters of the fourth embodiment based on Table 7 and Table 8 are listed in the following table:

Fourth embodiment (Reference wavelength: 555 nm)

| ETP1 | ETP2 | ETP3 | ETP4 | ETP5 | BL |
|---|---|---|---|---|---|
| 0.511 | 0.533 | 0.456 | 0.604 | 0.681 | 1.31083 |

| ETP1/TP1 | ETP2/TP2 | ETP3/TP3 | ETP4/TP4 | ETP5/TP5 | EBL/BL |
|---|---|---|---|---|---|
| 0.632 | 0.844 | 1.835 | 0.641 | 2.064 | 0.98716 |

| ETL | EBL | EIN | EIR | PIR | EIN/ETL |
|---|---|---|---|---|---|
| 5.360 | 1.294 | 4.065 | 0.483 | 0.500 | 0.759 |

Fourth embodiment (Reference wavelength: 555 nm)

| SETP/EIN | EIR/PIR | SETP | STP | SETP/STP | SED/SIN |
|---|---|---|---|---|---|
| 0.685 | 0.967 | 2.784 | 2.960 | 0.940 | 0.923 |

| ED12 | ED23 | ED34 | ED45 | SED | SIN |
|---|---|---|---|---|---|
| 0.278 | 0.060 | 0.547 | 0.397 | 1.282 | 1.389 |

| ED12/IN12 | ED23/IN23 | ED34/IN34 | ED45/IN45 |
|---|---|---|---|
| 0.527 | 0.222 | 5.773 | 0.800 |

| |f/f1| | |f/f2| | |f/f3| | |f/f4| | |f/f5| | |f1/f2| |
|---|---|---|---|---|---|
| 0.81242 | 0.56546 | 1.15802 | 1.74147 | 1.40876 | 0.69601 |

-continued

| Fourth embodiment (Reference wavelength: 555 nm) | | | | | |
|---|---|---|---|---|---|
| ΣPPR | ΣNPR | ΣPPR/ΣNPR | IN12/f | IN45/f | \|f2/f3\| |
| 3.11934 | 2.56678 | 1.21527 | 0.12539 | 0.11814 | 2.04794 |
| TP3/(IN23 + TP3 + IN34) | | (TP1 + IN12)/TP2 | | (TP5 + IN45)/TP4 | |
| 0.40438 | | 2.11487 | | 0.87664 | |
| HOS | InTL | HOS/HOI | InS/HOS | \|ODT\|% | \|TDT\|% |
| 5.66000 | 4.34917 | 1.51337 | 0.94693 | 2.00001 | 0.770827 |
| HVT41 | HVT42 | HVT51 | HVT52 | HVT52/HOI | HVT52/HOS |
| 1.24618 | 0.00000 | 0.00000 | 1.05547 | 0.00000 | 0.00000 |
| TP2/TP3 | TP3/TP4 | InRS51 | InRS52 | \|InRS51\|/TP5 | \|InRS52\|/TP5 |
| 2.54281 | 0.26343 | −1.14425 | −0.837308 | 3.46965 | 2.53893 |

The results of the equations of the fourth embodiment based on Table 7 and Table 8 are listed in the following table:

| Values related to the inflection points of the fourth embodiment (Reference wavelength: 555 nM) | | | | | |
|---|---|---|---|---|---|
| HIF111 | 1.10981 | HIF111/HOI 0.29674 | SGI111 | 0.27398 | \|SGI111\|/(\|SGI111\| + TP1) 0.25316 |
| HIF121 | 0.58554 | HIF121/HOI 0.15656 | SGI121 | 0.01749 | \|SGI121\|/(\|SGI121\| + TP1) 0.02119 |
| HIF122 | 1.25346 | HIF122/HOI 0.33515 | SGI122 | −0.02289 | \|SGI122\|/(\|SGI122\| + TP1) 0.02754 |
| HIF311 | 1.34003 | HIF311/HOI 0.35830 | SGI311 | −0.69251 | \|SGI311\|/(\|SGI311\| + TP3) 0.73609 |
| HIF321 | 0.96656 | HIF321/HOI 0.25844 | SGI321 | −0.26798 | \|SGI321\|/(\|SGI321\| + TP3) 0.51908 |
| HIF411 | 0.58131 | HIF411/HOI 0.15543 | SGI411 | 0.04891 | \|SGI411\|/(\|SGI411\| + TP4) 0.04934 |
| HIF412 | 1.88281 | HIF412/HOI 0.50343 | SGI412 | −0.03956 | \|SGI412\|/(\|SGI412\| + TP4) 0.04028 |
| HIF421 | 1.35333 | HIF421/HOI 0.36185 | SGI421 | −0.30581 | \|SGI421\|/(\|SGI421\| + TP4) 0.24498 |
| HIF422 | 1.77802 | HIF422/HOI 0.47541 | SGI422 | −0.46077 | \|SGI422\|/(\|SGI422\| + TP4) 0.32836 |
| HIF511 | 1.68428 | HIF511/HOI 0.45034 | SGI511 | 0.66548 | \|SGI511\|/(\|SGI511\| + TP5) 0.66864 |
| HIF512 | 1.80816 | HIF512/HOI 0.48347 | SGI512 | −0.75014 | \|SGI512\|/(\|SGI512\| + TP5) 0.69462 |
| HIF521 | 0.60716 | HIF521/HOI 0.16234 | SGI521 | 0.00966 | \|SGI521\|/(\|SGI521\| + TP5) 0.02847 |

Fifth Embodiment

Figure 5A:
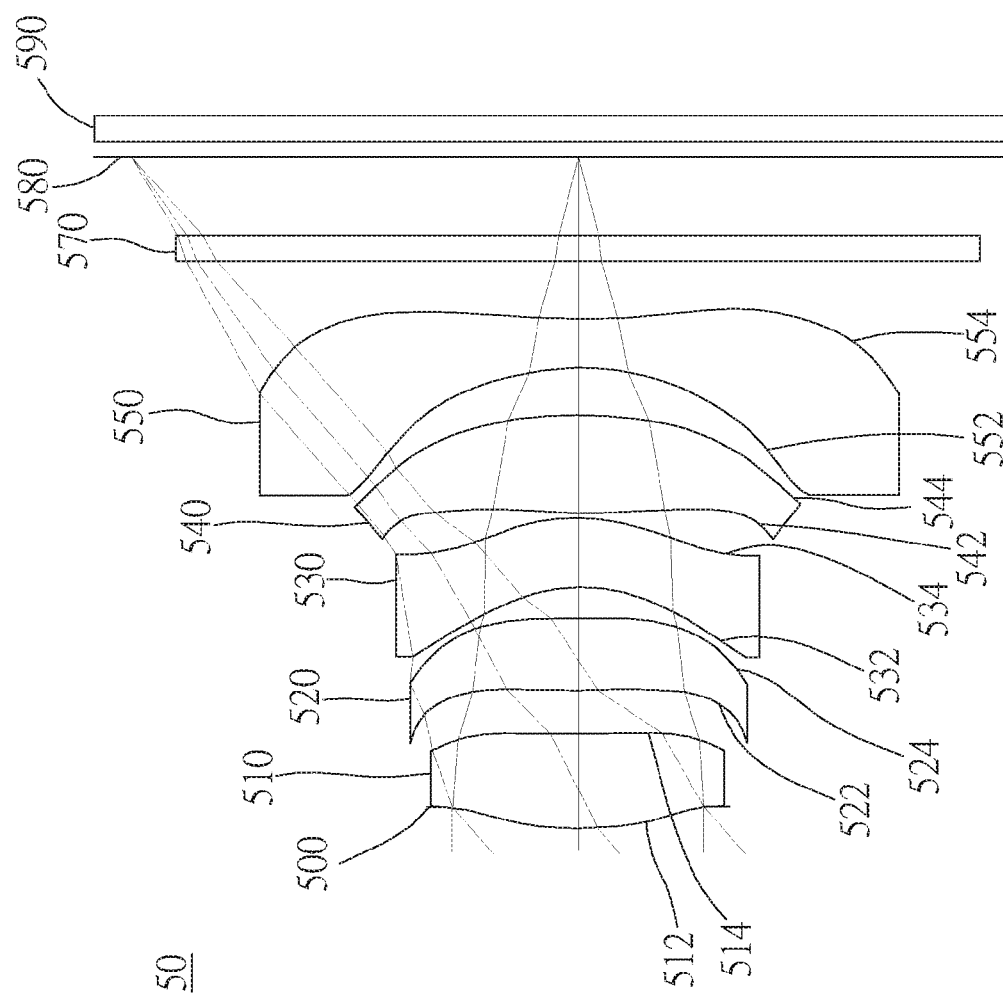
FIG. 5A is a schematic diagram of a fifth embodiment of the present invention.
Figure 5:
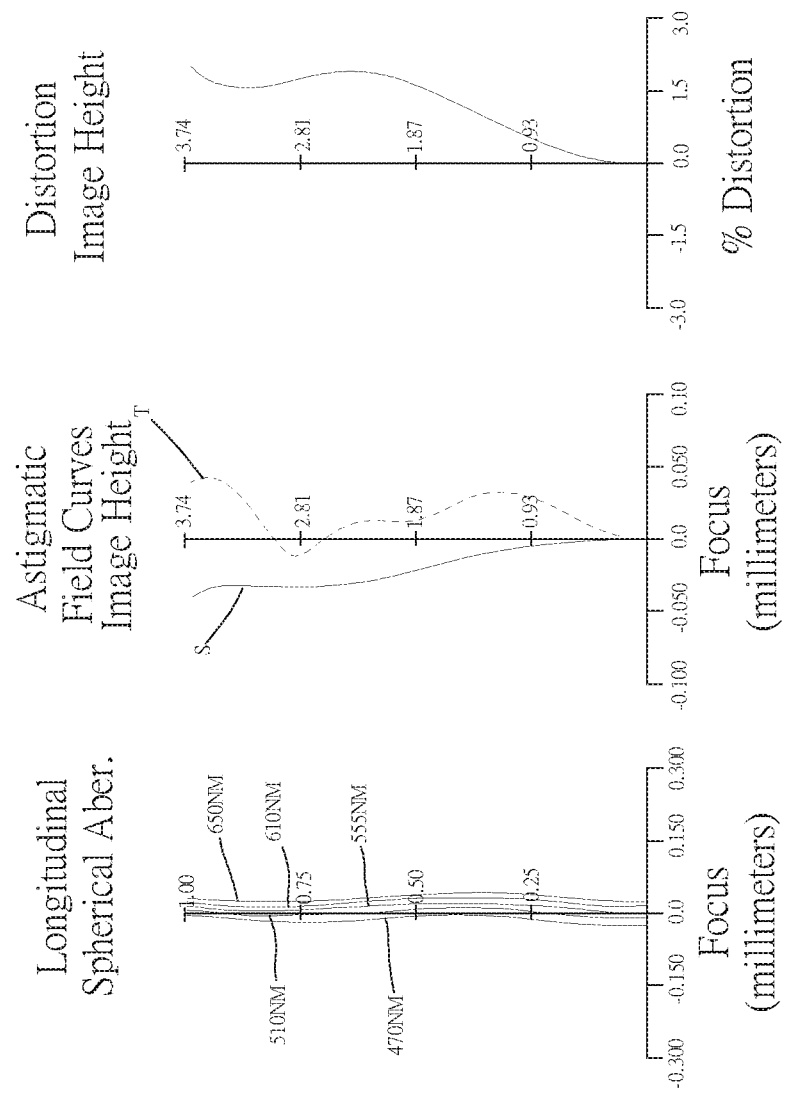
FIG. 5B shows curve diagrams of longitudinal spherical aberration, astigmatic field, and optical distortion of the optical image capturing system in the order from left to right of the fifth embodiment of the present application.
FIG. 5C shows a feature map of modulation transformation of the optical image capturing system of the fifth embodiment of the present application.
Figure 5C:
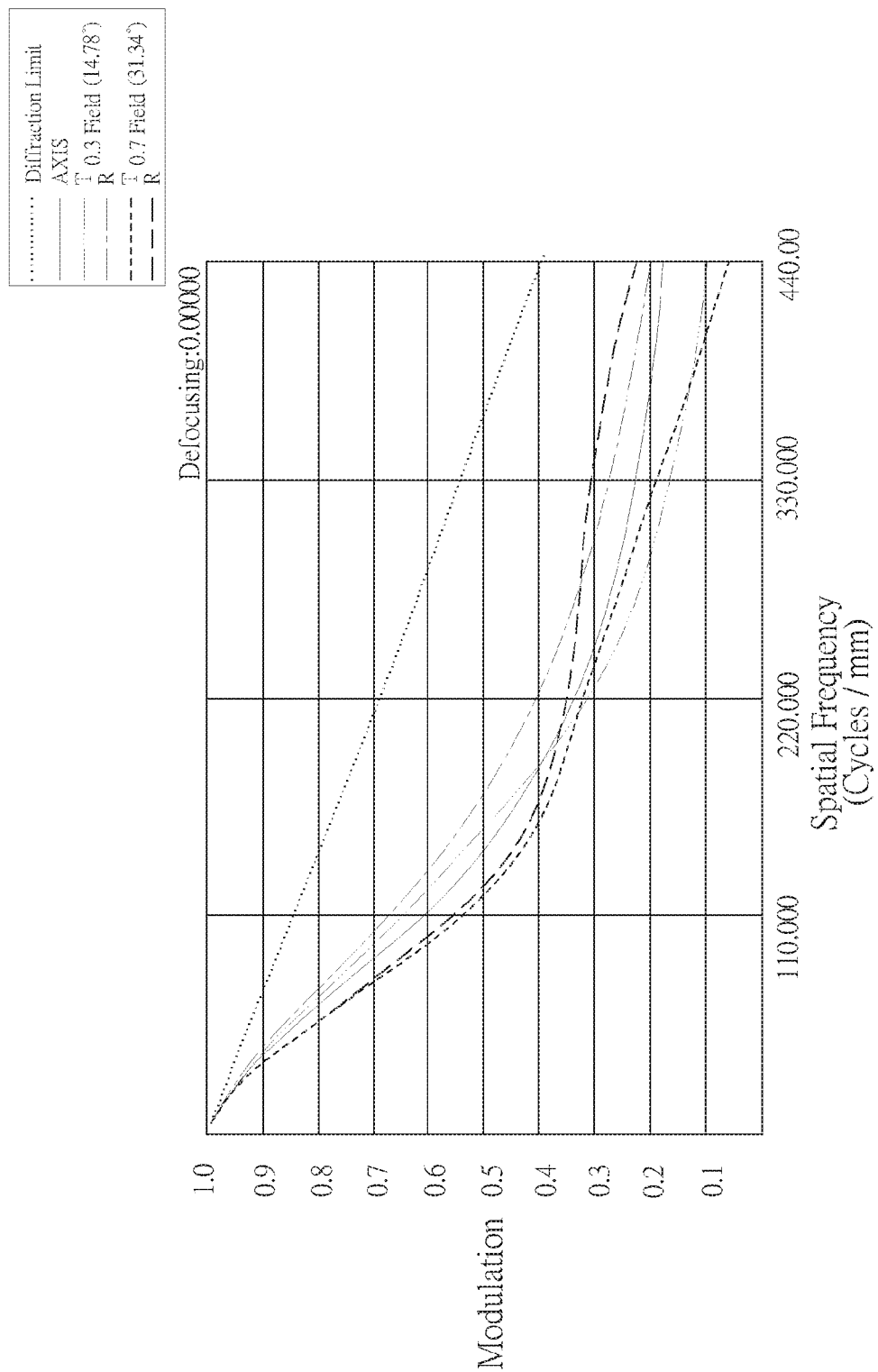

As shown in FIG. 5A and FIG. 5B, an optical image capturing system of the fifth embodiment of the present invention includes, along an optical axis from an object side to an image side, an aperture 500, a first lens 510, a second lens 520, a third lens 530, a fourth lens 540, a fifth lens 550, an infrared rays filter 580, an image plane 590, and an image sensor 592. FIG. 5C shows a modulation transformation of the optical image capturing system 50 of the fifth embodiment of the present application.

The first lens 510 has positive refractive power and is made of plastic. An object-side surface 512, which faces the object side, is a convex aspheric surface, and an image-side surface 514, which faces the image side, is a concave aspheric surface. The object-side surface 512 has an inflection point, and the image-side surface 514 has an inflection point.

The second lens 520 has positive refractive power and is made of plastic. An object-side surface 522 thereof, which faces the object side, is a convex aspheric surface, and an image-side surface 524 thereof, which faces the image side, is a convex aspheric surface. The object-side surface 522 has an inflection point.

The third lens 530 has negative refractive power and is made of plastic. An object-side surface 532, which faces the object side, is a concave aspheric surface, and an image-side surface 534, which faces the image side, is a convex aspheric surface. The object-side surface 532 and the image-side surface 534 both have an inflection point thereon.

The fourth lens 540 has positive refractive power and is made of plastic. An object-side surface 542, which faces the object side, is a convex aspheric surface, and an image-side surface 544, which faces the image side, is a convex aspheric surface. The object-side surface 542 and the image-side surface 544 both have an inflection point.

The fifth lens 550 has negative refractive power and is made of plastic. An object-side surface 552, which faces the object side, is a concave surface, and an image-side surface 554, which faces the image side, is a concave surface. It may help to shorten the back focal length to keep small in size. In addition, the object-side surface 552 and the image-side surface 554 both have an inflection point, which may reduce an incident angle of the light of an off-axis field of view and correct the aberration of the off-axis field of view.

The infrared rays filter 580 is made of glass and between the fifth lens 550 and the image plane 590. The infrared rays filter 580 gives no contribution to the focal length of the system.

The optical image capturing system of the second embodiment satisfies $|f2|+|f3|+|f4|=19.1654$ mm; $|f1|+|f5|=7.8539$ mm; and $|f2|+|f3|+|f4|>|f1|+|f5|$, where f2 is a focal length of the second lens 520, f3 is a focal length of the third lens 530, f4 is a focal length of the fourth lens 540, and f5 is a focal length of the fifth lens 550.

In the fifth embodiment, the optical image capturing system of the fifth embodiment further satisfies $\Sigma PP=15.10898$ mm; and $f1/\Sigma PP=0.34138$, where $\Sigma PP$ is a sum of the focal lengths of each positive lens. It is helpful to share the positive refractive power of the first lens 510 to other positive lenses to avoid the significant aberration caused by the incident rays.

The optical image capturing system of the fifth embodiment further satisfies $\Sigma NP=-11.91030$ mm; and $f5/\Sigma NP=0.22635$, where $\Sigma NP$ is a sum of the focal lengths of each negative lens. It is helpful to share the negative refractive power of the fifth lens 550 to the other negative lens.

For the optical image capturing system of the fifth embodiment, the values of MTF in a quarter of the spatial frequency (110 cycles/mm) at the optical axis, 0.3 field of view, and 0.7 field of view on an image plane are respectively denoted by MTFQ0, MTFQ3, and MTFQ7, wherein MTFQ0 is around 0.62, MTFQ3 is around 0.65, and MTFQ7 is around 0.54; the values of modulation transfer function (MTF) in half frequency (220 cycles/mm) at the optical axis, 0.3 field of view, and 0.7 field of view on an image plane are respectively denoted by MTFH0, MTFH3, and MTFH7, wherein MTFH0 is around 0.34, MTFH3 is around 0.32, and MTFH7 is around 0.32.

The parameters of the lenses of the fifth embodiment are listed in Table 9 and Table 10.

TABLE 9 f = 4.21089 mm; f/HEP = 2.0; HAF = 41.0001 deg

| Surface | | Radius of curvature (mm) | Thickness (mm) | Material | Refractive index | Abbe number | Focal length (mm) |
|---|---|---|---|---|---|---|---|
| 0 | Object | plane | infinity | | | | |
| 1 | Aperture | plane | −0.178 | | | | |
| 2 | 1st lens | 2.619856579 | 0.801 | plastic | 1.565 | 58.00 | 5.158 |
| 3 | | 22.44031075 | 0.359 | | | | |
| 4 | 2nd lens | 9.289883667 | 0.619 | plastic | 1.565 | 58.00 | 6.435 |
| 5 | | −5.860242904 | 0.257 | | | | |
| 6 | 3rd lens | −1.103740879 | 0.574 | plastic | 1.650 | 21.40 | −9.214 |
| 7 | | −1.628526736 | 0.050 | | | | |
| 8 | 4th lens | 5.706526229 | 0.833 | plastic | 1.583 | 30.20 | 3.516 |
| 9 | | −3.054497013 | 0.388 | | | | |
| 10 | 5th lens | −2.182932859 | 0.419 | plastic | 1.583 | 30.20 | −2.696 |
| 11 | | 6.142379884 | 0.500 | | | | |
| 12 | Infrared rays filter | plane | 0.200 | | 1.517 | 64.13 | |
| 13 | | plane | 0.654 | | | | |
| 14 | Image plane | plane | | | | | |

Reference wavelength: 555 nm.

TABLE 10

Coefficients of the aspheric surfaces

| Surface | 2 | 3 | 4 | 5 | 6 | 7 |
|---|---|---|---|---|---|---|
| k | −1.018743E+01 | −3.660821E+01 | 2.205838E+01 | −6.852040E+00 | −3.016346E+00 | −1.169209E+00 |
| A4 | 5.087558E−02 | −5.167502E−02 | −7.536045E−02 | −3.669699E−02 | −1.265325E−02 | 5.890609E−02 |
| A6 | −3.931867E−02 | −3.503191E−02 | −1.416246E−02 | −5.917379E−02 | 1.232353E−02 | 8.244388E−03 |
| A8 | 4.261705E−03 | 2.663119E−02 | −4.037038E−02 | 9.965343E−03 | 6.998031E−03 | 8.911492E−03 |
| A10 | 4.853782E−03 | −2.493933E−02 | 8.767563E−03 | 6.688493E−03 | −3.850589E−03 | −4.811233E−03 |
| A12 | −7.117559E−03 | 1.293040E−02 | 2.982246E−02 | −3.528370E−04 | −7.964218E−03 | −2.512882E−03 |
| A14 | 1.446733E−03 | −2.273871E−03 | −1.346964E−02 | −1.205367E−03 | 3.547856E−03 | 1.157395E−03 |

| Surface | 8 | 9 | 10 | 11 |
|---|---|---|---|---|
| k | −3.135558E+01 | −4.270897E−01 | 1.824131E−01 | −2.399117E+01 |
| A4 | −6.612360E−02 | −2.404983E−02 | 1.123612E−02 | −1.706769E−02 |
| A6 | 3.355475E−02 | 1.687846E−02 | −6.275812E−04 | −1.865036E−05 |
| A8 | −7.261958E−03 | −4.425273E−03 | −3.430921E−04 | −1.193521E−05 |
| A10 | −5.951389E−03 | −1.356273E−04 | −5.180538E−04 | 4.721293E−06 |
| A12 | 3.438691E−03 | −3.667174E−04 | −1.881813E−04 | 4.095122E−07 |
| A14 | −6.483059E−04 | 1.281835E−04 | 1.077484E−04 | −2.171827E−07 |

An equation of the aspheric surfaces of the fifth embodiment is the same as that of the first embodiment, and the definitions are the same as well.

The exact parameters of the fifth embodiment based on Table 9 and Table 10 are listed in the following table:

Fifth embodiment (Reference wavelength: 555 nm)

| ETP1 | ETP2 | ETP3 | ETP4 | ETP5 | BL |
|---|---|---|---|---|---|
| 0.555 | 0.491 | 0.702 | 0.606 | 0.739 | 1.35432 |

| ETP1/TP1 | ETP2/TP2 | ETP3/TP3 | ETP4/TP4 | ETP5/TP5 | EBL/BL |
|---|---|---|---|---|---|
| 0.692 | 0.794 | 1.224 | 0.727 | 1.765 | 0.95768 |

| ETL | EBL | EIN | EIR | PIR | EIN/ETL |
|---|---|---|---|---|---|
| 5.475 | 1.297 | 4.179 | 0.442 | 0.500 | 0.763 |

Fifth embodiment (Reference wavelength: 555 nm)

| SETP/EIN | EIR/PIR | SETP | STP | SETP/STP | SED/SIN |
|---|---|---|---|---|---|
| 0.740 | 0.885 | 3.093 | 3.246 | 0.953 | 1.031 |

| ED12 | ED23 | ED34 | ED45 | SED | SIN |
|---|---|---|---|---|---|
| 0.362 | 0.074 | 0.326 | 0.323 | 1.085 | 1.053 |

| ED12/IN12 | ED23/IN23 | ED34/IN34 | ED45/IN45 |
|---|---|---|---|
| 1.010 | 0.286 | 6.528 | 0.834 |

| |f/f1| | |f/f2| | |f/f3| | |f/f4| | |f/f5| | |f1/f2| |
|---|---|---|---|---|---|
| 0.81639 | 0.65436 | 0.45699 | 1.19767 | 1.56193 | 0.80152 |

-continued

| Fifth embodiment (Reference wavelength: 555 nm) | | | | | |
|---|---|---|---|---|---|
| ΣPPR | ΣNPR | ΣPPR/\|ΣNPR\| | IN12/f | IN45/f | \|f2/f3\| |
| 2.66842 | 2.01892 | 1.32170 | 0.08514 | 0.09205 | 0.69839 |
| TP3/(IN23 + TP3 + IN34) | | (TP1 + IN12)/TP2 | | (TP5 + IN45)/TP4 | |
| 0.65157 | | 1.87401 | | 0.96859 | |
| HOS | InTL | HOS/HOI | InS/HOS | \|ODT\|% | \|TDT\|% |
| 5.65293 | 4.29861 | 1.51148 | 0.96860 | 2 | 0.434171 |
| HVT41 | HVT42 | HVT51 | HVT52 | HVT52/HOI | HVT52/HOS |
| 0.92070 | 0.00000 | 0.00000 | 1.29318 | 0.00000 | 0.00000 |
| TP2/TP3 | TP3/TP4 | InRS51 | InRS52 | \|InRS51\|/TP5 | \|InRS52\|/TP5 |
| 1.07856 | 0.68889 | −1.07862 | −0.627957 | 2.57384 | 1.49845 |

The results of the equations of the fifth embodiment based on Table 9 and Table 10 are listed in the following table:

| Values related to the inflection points of the fifth embodiment (Reference wavelength: 555 nM) | | | | | | |
|---|---|---|---|---|---|---|
| HIF111 | 0.86222 | HIF111/HOI | 0.23054 | SGI111 | 0.13097 | \|SGI111\|/(\|SGI111\| + TP1) 0.14050 |
| HIF121 | 0.25468 | HIF121/HOI | 0.06809 | SGI121 | 0.00122 | \|SGI121\|/(\|SGI121\| + TP1) 0.00152 |
| HIF211 | 0.33903 | HIF211/HOI | 0.09065 | SGI211 | 0.00521 | \|SGI211\|/(\|SGI211\| + TP2) 0.00835 |
| HIF311 | 1.28477 | HIF311/HOI | 0.34352 | SGI311 | −0.52701 | \|SGI311\|/(\|SGI311\| + TP3) 0.47877 |
| HIF321 | 0.79281 | HIF321/HOI | 0.21198 | SGI321 | −0.16495 | \|SGI321\|/(\|SGI321\| + TP3) 0.22330 |
| HIF411 | 0.47132 | HIF411/HOI | 0.12602 | SGI411 | 0.01563 | \|SGI411\|/(\|SGI411\| + TP4) 0.01842 |
| HIF421 | 1.70191 | HIF421/HOI | 0.45506 | SGI421 | −0.62539 | \|SGI421\|/(\|SGI421\| + TP4) 0.42886 |
| HIF511 | 1.70516 | HIF511/HOI | 0.45593 | SGI511 | −0.84886 | \|SGI511\|/(\|SGI511\| + TP5) 0.66948 |
| HIF521 | 0.72357 | HIF521/HOI | 0.19347 | SGI521 | −0.03499 | \|SGI521\|/(\|SGI521\| + TP5) 0.07706 |

Sixth Embodiment

Figure 6A:
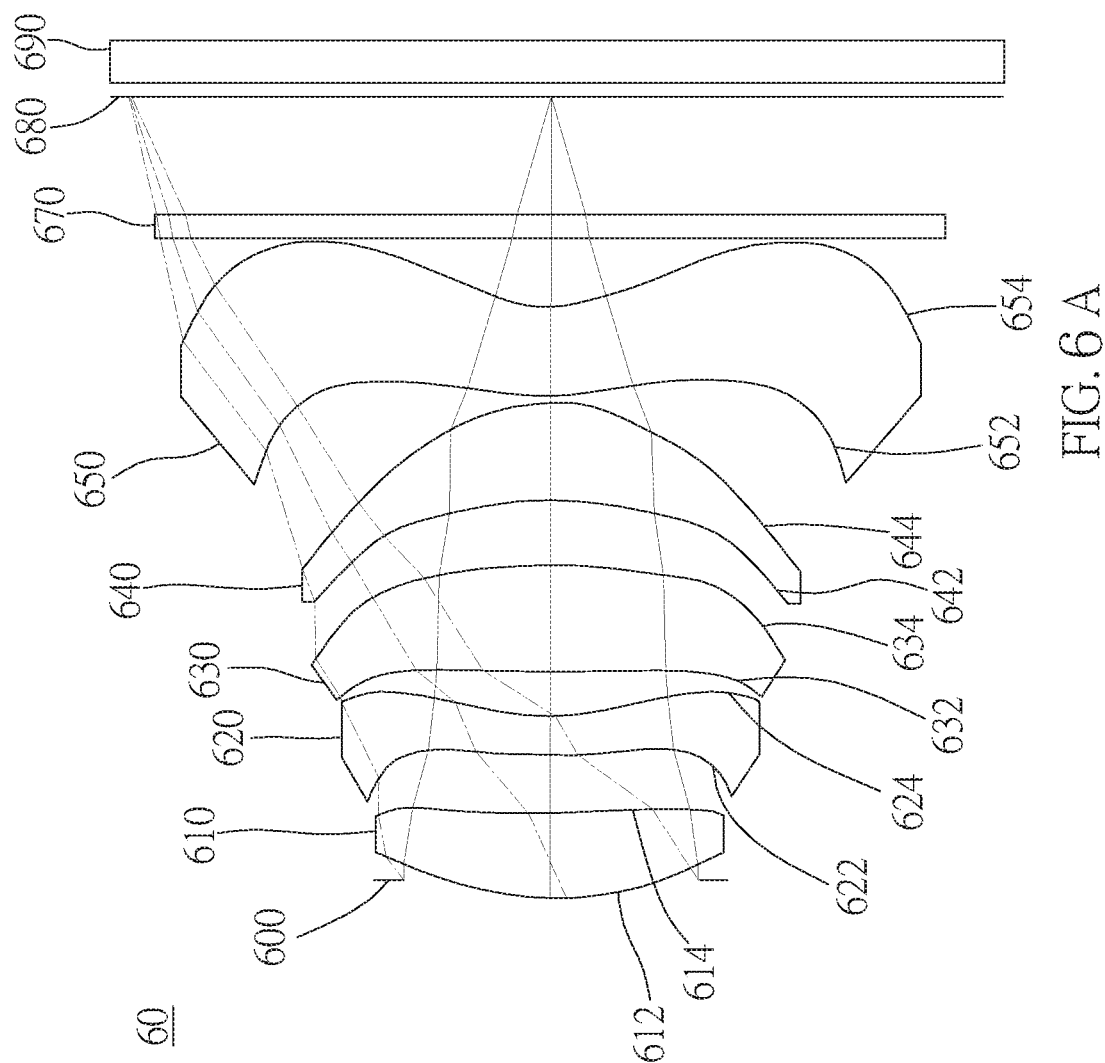
FIG. 6A is a schematic diagram of a sixth embodiment of the present invention.
Figure 6B:
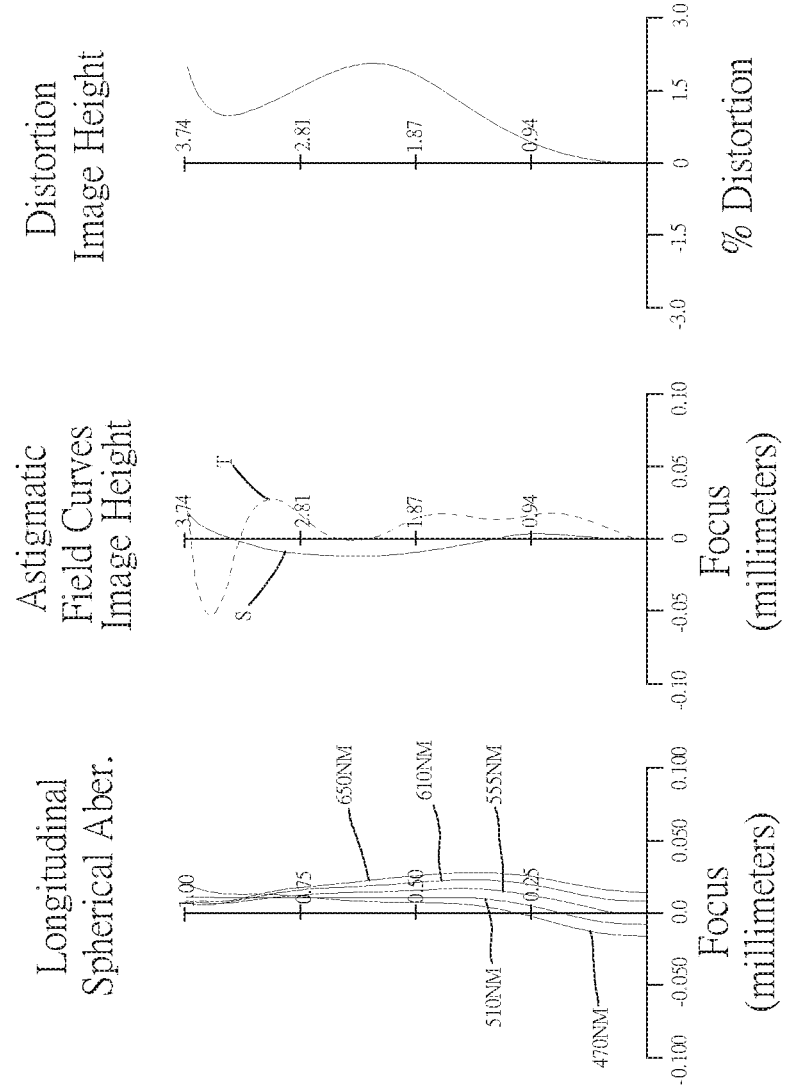
FIG. 6B shows curve diagrams of longitudinal spherical aberration, astigmatic field, and optical distortion of the optical image capturing system in the order from left to right of the sixth embodiment of the present application.
Figure 6C:
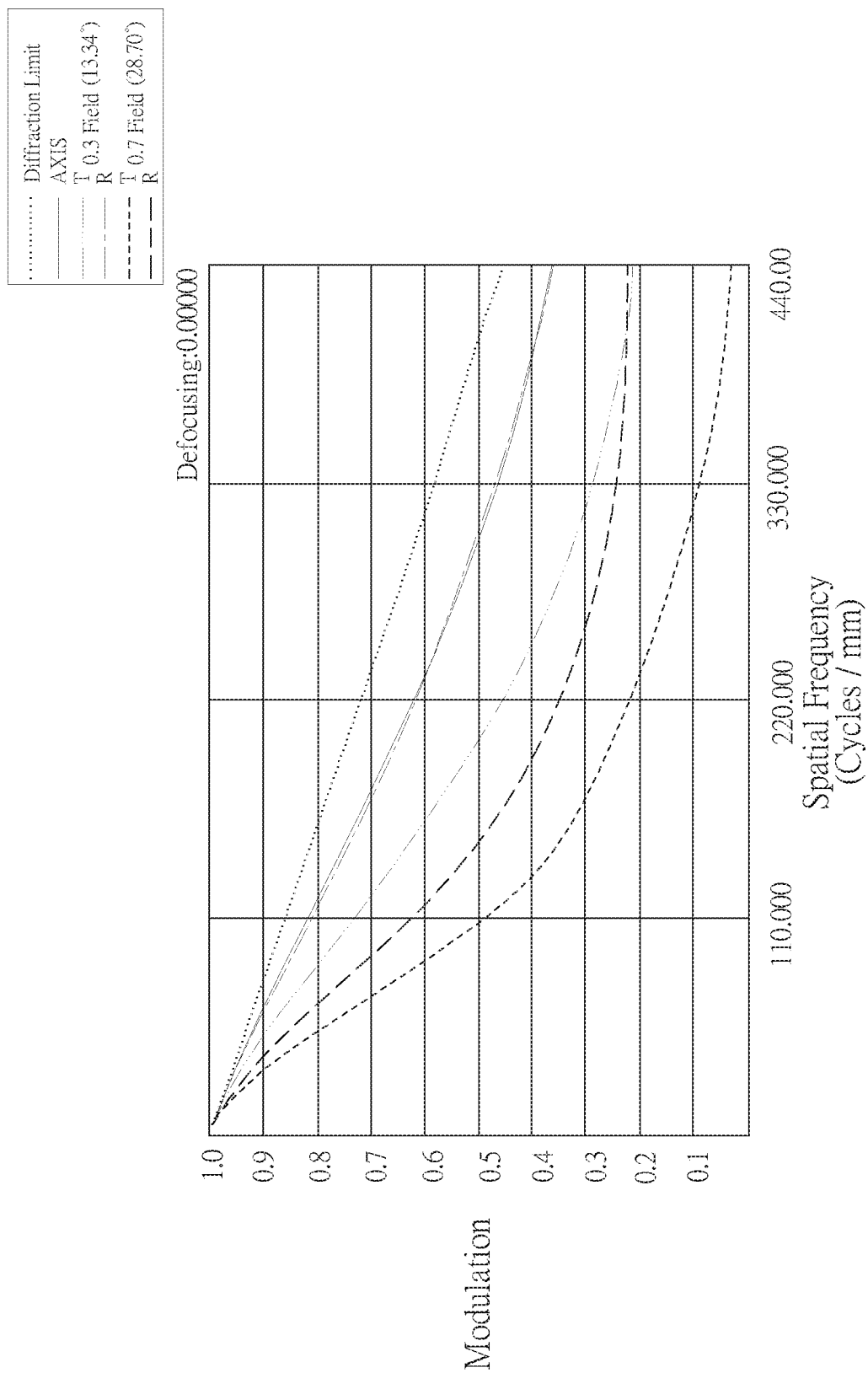
FIG. 6C shows a feature map of modulation transformation of the optical image capturing system of the sixth embodiment of the present application.

As shown in FIG. 6A and FIG. 6B, an optical image capturing system of the sixth embodiment of the present invention includes, along an optical axis from an object side to an image side, an aperture 600, a first lens 610, a second lens 620, a third lens 630, a fourth lens 640, a fifth lens 650, an infrared rays filter 680, an image plane 690, and an image sensor 692. FIG. 6C shows a modulation transformation of the optical image capturing system 60 of the sixth embodiment of the present application.

The first lens 610 has positive refractive power and is made of plastic. An object-side surface 612, which faces the object side, is a convex aspheric surface, and an image-side surface 614, which faces the image side, is a concave aspheric surface. The object-side surface 612 and the image-side surface 614 both have an inflection point.

The second lens 620 has negative refractive power and is made of plastic. An object-side surface 622 thereof, which faces the object side, is a convex aspheric surface, and an image-side surface 624 thereof, which faces the image side, is a concave aspheric surface. The object-side surface 622 and the image-side surface 624 respectively have an inflection point.

The third lens 630 has positive refractive power and is made of plastic. An object-side surface 632, which faces the object side, is a convex aspheric surface, and an image-side surface 634, which faces the image side, is a convex aspheric surface. The object-side surface 632 has an inflection point.

The fourth lens 640 has positive refractive power and is made of plastic. An object-side surface 642, which faces the object side, is a concave aspheric surface, and an image-side surface 644, which faces the image side, is a convex aspheric surface. The object-side surface 642 and the image-side surface both have an inflection point.

The fifth lens 650 has negative refractive power and is made of plastic. An object-side surface 652, which faces the object side, is a convex surface, and an image-side surface 654, which faces the image side, is a concave surface. The object-side surface 652 and the image-side surface 654 both have an inflection point. It may help to shorten the back focal length to keep small in size. In addition, it may reduce an incident angle of the light of an off-axis field of view and correct the aberration of the off-axis field of view.

The infrared rays filter 680 is made of glass and between the fifth lens 650 and the image plane 690. The infrared rays filter 680 gives no contribution to the focal length of the system.

The optical image capturing system of the second embodiment satisfies $|f2|+|f3|+|f4|=26.1024$ mm; $|f1|+|f5|=10.9792$ mm; and $|f2|+|f3|+|f4|>|f1|+|f5|$, where f2 is a focal length of the second lens 620, f3 is a focal length of the third lens 630, f4 is a focal length of the fourth lens 640, and f5 is a focal length of the fifth lens 650.

In the sixth embodiment, the first lens 610, the third lens 630, and the fourth lenses 640 are positive lenses, and their focal lengths are f1, f3, and f4. The optical image capturing system of the sixth embodiment further satisfies $\Sigma PP=f1+f3+f4=21.25779$ mm; and $f1/(f1+f3+f4)=0.35286$, where f1 is a focal length of the first lens 610, f3 is a focal length of the third lens 630, f4 is a focal length of the fourth lens 640, and ΣPP is a sum of the focal lengths of each positive lens. It is helpful to share the positive refractive power of the first lens 610 to other positive lenses to avoid the significant aberration caused by the incident rays.

The optical image capturing system of the sixth embodiment further satisfies $\Sigma NP=f2+f5=-15.82380$ mm; and $f5/(f2+f5)=0.21980$, where f2 is a focal length of the second lens 620, f5 is a focal length of the fifth lens 650, and ΣNP is a sum of the focal lengths of each negative lens. It is helpful to share the negative refractive power of the fifth lens 650 to the other negative lens to avoid the significant aberration caused by the incident rays.

For the optical image capturing system of the sixth embodiment, the values of MTF in a quarter of the spatial frequency (110 cycles/mm) at the optical axis, 0.3 field of view, and 0.7 field of view on an image plane are respectively denoted by MTFQ0, MTFQ3, and MTFQ7, wherein MTFQ0 is around 0.82, MTFQ3 is around 0.74, and MTFQ7 is around 0.48; the values of modulation transfer function (MTF) in half frequency (220 cycles/mm) at the optical axis, 0.3 field of view, and 0.7 field of view on an image plane are respectively denoted by MTFH0, MTFH3, and MTFH7, wherein MTFH0 is around 0.62, MTFH3 is around 0.46, and MTFH7 is around 0.23.

The parameters of the lenses of the sixth embodiment are listed in Table 11 and Table 12.

TABLE 11 f = 4.68853 mm; f/HEP = 1.8; HAF = 38 deg

| Surface | | Radius of curvature (mm) | Thickness (mm) | Material | Refractive index | Abbe number | Focal length (mm) |
|---|---|---|---|---|---|---|---|
| 0 | Object | plane | infinity | | | | |
| 1 | Aperture | plane | −0.161 | | | | |
| 2 | 1$^{st}$ lens | 3.01192719 | 0.733 | Plastic | 1.565 | 58.00 | 7.501 |
| 3 | | 9.421637837 | 0.507 | | | | |
| 4 | 2$^{nd}$ lens | 3.43459039 | 0.354 | Plastic | 1.650 | 21.40 | −12.346 |
| 5 | | 2.312881196 | 0.381 | | | | |
| 6 | 3$^{rd}$ lens | 31.28111475 | 0.939 | Plastic | 1.565 | 58.00 | 10.566 |
| 7 | | −7.326192096 | 0.565 | | | | |
| 8 | 4$^{th}$ lens | −3.376711742 | 0.871 | Plastic | 1.565 | 58.00 | 3.191 |
| 9 | | −1.287601945 | 0.050 | | | | |
| 10 | 5$^{th}$ lens | 2.900744957 | 0.780 | Plastic | 1.583 | 30.20 | −3.478 |
| 11 | | 1.078636748 | 0.600 | | | | |
| 12 | Infrared rays filter | plane | 0.200 | | 1.517 | 64.13 | |
| 13 | | plane | 1.063 | | | | |
| 14 | Image plane | plane | | | | | |

Reference wavelength: 555 nm; the position of blocking light: blocking at the first surface with effective semi diameter of 1.8 mm; blocking at the fourth surface with effective semi diameter of 1.7 mm.

TABLE 12

Coefficients of the aspheric surfaces

| Surface | 2 | 3 | 4 | 5 | 6 | 7 |
|---|---|---|---|---|---|---|
| k | −4.535402E+00 | −2.715541E+01 | −1.260125E+01 | −5.105631E+00 | 5.000000E+01 | −1.859382E+01 |
| A4 | 2.082750E−02 | −1.073248E−02 | −5.261525E−02 | −3.206506E−02 | −9.901981E−03 | −1.596918E−02 |
| A6 | 7.145606E−04 | 3.186801E−03 | −5.093252E−03 | −7.282021E−04 | 7.496969E−04 | −3.446354E−03 |
| A8 | −2.543825E−03 | −1.975121E−03 | −1.592440E−03 | 1.658718E−03 | −4.089758E−05 | 8.044274E−04 |
| A10 | 8.565422E−04 | −6.414664E−04 | 5.578372E−04 | −3.523094E−04 | 8.234584E−05 | 1.656935E−05 |
| A12 | 2.729945E−04 | 4.532820E−04 | 2.855392E−04 | −1.912872E−04 | −4.010367E−05 | −1.337763E−04 |
| A14 | −2.170476E−04 | −2.132353E−04 | −3.628428E−04 | 4.530383E−05 | 7.916187E−05 | 1.688031E−05 |

| Surface | 8 | 9 | 10 | 11 |
|---|---|---|---|---|
| k | −1.670156E+01 | −3.375565E+00 | −1.442939E+01 | −4.631718E+00 |
| A4 | −1.526929E−02 | −2.365253E−02 | −1.723102E−02 | −1.698217E−02 |
| A6 | −3.824708E−04 | 1.681813E−03 | −2.048496E−03 | 8.623572E−04 |
| A8 | −6.977028E−04 | −2.547813E−04 | 3.394994E−05 | −7.206398E−05 |
| A10 | −1.403571E−04 | −1.681747E−04 | 5.267951E−05 | −2.098743E−08 |
| A12 | −1.648954E−05 | −1.593035E−05 | 8.642871E−06 | 6.974444E−07 |
| A14 | 1.256451E−05 | 1.076519E−05 | −2.259826E−06 | −6.501014E−08 |

An equation of the aspheric surfaces of the sixth embodiment is the same as that of the first embodiment, and the definitions are the same as well.

The exact parameters of the sixth embodiment based on Table 11 and Table 12 are listed in the following table:

Sixth embodiment (Reference wavelength: 555 nm)

| ETP1 | ETP2 | ETP3 | ETP4 | ETP5 | BL |
|---|---|---|---|---|---|
| 0.477 | 0.557 | 0.780 | 0.576 | 1.041 | 1.86252 |

| ETP1/TP1 | ETP2/TP2 | ETP3/TP3 | ETP4/TP4 | ETP5/TP5 | EBL/BL |
|---|---|---|---|---|---|
| 0.651 | 1.575 | 0.831 | 0.661 | 1.335 | 0.78388 |

| ETL | EBL | EIN | EIR | PIR | EIN/ETL |
|---|---|---|---|---|---|
| 6.743 | 1.460 | 5.283 | 0.197 | 0.600 | 0.784 |

Sixth embodiment (Reference wavelength: 555 nm)

| SETP/EIN | EIR/PIR | SETP | STP | SETP/STP | SED/SIN |
|---|---|---|---|---|---|
| 0.650 | 0.328 | 3.431 | 3.676 | 0.933 | 1.232 |

| ED12 | ED23 | ED34 | ED45 | SED | SIN |
|---|---|---|---|---|---|
| 0.462 | 0.177 | 0.495 | 0.718 | 1.852 | 1.502 |

| ED12/IN12 | ED23/IN23 | ED34/IN34 | ED45/IN45 |
|---|---|---|---|
| 0.912 | 0.465 | 0.876 | 14.351 |

| |f/f1| | |f/f2| | |f/f3| | |f/f4| | |f/f5| | |f1/f2| |
|---|---|---|---|---|---|
| 0.62505 | 0.37977 | 0.44373 | 1.46946 | 1.34801 | 0.60758 |

-continued

Sixth embodiment (Reference wavelength: 555 nm)

| ΣPPR | ΣNPR | ΣPPR/\|ΣNPR\| | IN12/f | IN45/f | \|f2/f3\| |
|---|---|---|---|---|---|
| 2.53825 | 1.72779 | 1.46908 | 0.10804 | 0.01066 | 1.16843 |

| TP3/(IN23 + TP3 + IN34) | | (TP1 + IN12)/TP2 | | (TP5 + IN45)/TP4 | |
|---|---|---|---|---|---|
| 0.49811 | | 3.50429 | | 0.95237 | |

| HOS | InTL | HOS/HOI | InS/HOS | \|ODT\|% | \|TDT\|% |
|---|---|---|---|---|---|
| 7.04095 | 5.17843 | 1.88261 | 0.97708 | 2.06837 | 1.12761 |

| HVT41 | HVT42 | HVT51 | HVT52 | HVT52/HOI | HVT52/HOS |
|---|---|---|---|---|---|
| 0.00000 | 0.00000 | 1.39547 | 2.10022 | 0.37312 | 0.19819 |

| TP2/TP3 | TP3/TP4 | InRS51 | InRS52 | \|InRS51\|/TP5 | \|InRS52\|/TP5 |
|---|---|---|---|---|---|
| 0.37669 | 1.07753 | −0.482666 | −0.318016 | 0.61902 | 0.40786 |

The results of the equations of the sixth embodiment based on Table 11 and Table 12 are listed in the following table:

Values related to the inflection points of the sixth embodiment
(Reference wavelength: 555 nM)

| HIF111 | 1.33860 | HIF111/HOI | 0.35791 | SGI111 | 0.31505 | \|SGI111\|/(\|SGI111\| + TP1) | 0.30071 |
|---|---|---|---|---|---|---|---|
| HIF121 | 0.81088 | HIF121/HOI | 0.21681 | SGI121 | 0.02919 | \|SGI121\|/(\|SGI121\| + TP1) | 0.03832 |
| HIF211 | 0.54056 | HIF211/HOI | 0.14453 | SGI211 | 0.03523 | \|SGI211\|/(\|SGI211\| + TP2) | 0.09059 |
| HIF221 | 0.79896 | HIF221/HOI | 0.21363 | SGI221 | 0.11126 | \|SGI221\|/(\|SGI221\| + TP2) | 0.23933 |
| HIF311 | 0.53885 | HIF311/HOI | 0.14408 | SGI311 | 0.00384 | \|SGI311\|/(\|SGI311\| + TP3) | 0.00408 |
| HIF411 | 1.97823 | HIF411/HOI | 0.52894 | SGI411 | −0.76038 | \|SGI411\|/(\|SGI411\| + TP4) | 0.46603 |
| HIF421 | 1.95709 | HIF421/HOI | 0.52329 | SGI421 | −1.20467 | \|SGI421\|/(\|SGI421\| + TP4) | 0.58031 |
| HIF511 | 0.74546 | HIF511/HOI | 0.19932 | SGI511 | 0.07504 | \|SGI511\|/(\|SGI511\| + TP5) | 0.08779 |
| HIF521 | 0.88388 | HIF521/HOI | 0.23633 | SGI521 | 0.24377 | \|SGI521\|/(\|SGI521\| + TP5) | 0.23817 |

It must be pointed out that the embodiments described above are only some embodiments of the present invention. All equivalent structures which employ the concepts disclosed in this specification and the appended claims should fall within the scope of the present invention.

What is claimed is:

1. An optical image capturing system, in order along an optical axis from an object side to an image side, comprising:
   a first lens having refractive power;
   a second lens having refractive power;
   a third lens having refractive power;
   a fourth lens having refractive power;
   a fifth lens having refractive power; and
   an image plane;
   wherein the optical image capturing system consists of the five lenses with refractive power;
   each of at least two lenses among the first to the fifth lenses has at least an inflection point on at least one surface thereof; at least one lens among the first to the fifth lenses has positive refractive power; the fifth lens has an object-side surface, which faces the object side, and an image-side surface, which faces the image side, and both the object-side surface and the image-side surface of the fifth lens are aspheric surfaces;
   wherein the optical image capturing system satisfies:

$1.2 \leq f/HEP \leq 6.0$;

$0.5 \leq HOS/f \leq 3$; and $0.5 \leq SETP/STP \leq 1$;

where f1, f2, f3, f4, and f5 are focal lengths of the first lens to the fifth lens, respectively; f is a focal length of the optical image capturing system; HEP is an entrance pupil diameter of the optical image capturing system; HOS is a distance in parallel with the optical axis from a point on an object-side surface of the first lens where the optical axis passes through to a point on the image plane where the optical axis passes through; ETP1, ETP2, ETP3, ETP4, and ETP5 are respectively a thickness at the height of ½ HEP of the first lens, the second lens, the third lens, the fourth lens, and the fifth lens; SETP is a sum of the aforementioned ETP1 to ETP5; TP1, TP2, TP3, TP4, and TP5 are respectively a thickness of the first lens, the second lens, the third lens, the fourth lens, and the fifth lens on the optical axis; STP is a sum of the aforementioned TP1 to TP5;

wherein the optical image capturing system further satisfies:

$MTFH0 \geq 0.2$;

$MTFH3 \geq 0.2$; and $MTFH7 \geq 0.1$;

where HOI is a height for image formation perpendicular to the optical axis on the image plane; MTFH0, MTFH3, and MTFH7 are respectively a value of modulation transfer function in half frequency at the optical axis, 0.3 HOI, and 0.7 HOI on an image plane.

2. The optical image capturing system of claim 1, wherein the optical image capturing system further satisfies:

$0.2 < EIN/ETL < 1$;

where ETL is a distance in parallel with the optical axis between a coordinate point at a height of ½ HEP on the object-side surface of the first lens and the image plane; EIN is a distance in parallel with the optical axis between the coordinate point at the height of ½ HEP on the object-side surface of the first lens and a coordinate point at a height of ½ HEP on the image-side surface of the fifth lens.

3. The optical image capturing system of claim 2, wherein the optical image capturing system further satisfies:

$0.3 \leq SETP/EIN < 1$.

4. The optical image capturing system of claim 1, further comprising a filtering component provided between the fifth lens and the image plane, wherein the optical image capturing system further satisfies:

$0.1 \leq EIR/PIR \leq 0.8$;

where EIR is a horizontal distance in parallel with the optical axis between the coordinate point at the height of ½ HEP on the image-side surface of the fifth lens and the filtering component; PIR is a horizontal distance in parallel with the optical axis between a point on the image-side surface of the fifth lens where the optical axis passes through and the filtering component.

5. The optical image capturing system of claim 1, wherein at least one lens among the first to the fifth lenses has at least two inflection points on the object-side surface or the image-side surface thereof.

6. The optical image capturing system of claim 1, wherein the optical image capturing system further satisfies:

$0.4 \leq |\tan(HAF)| \leq 6.0$;

where HAF is a half of a view angle of the optical image capturing system.

7. The optical image capturing system of claim 1, wherein the optical image capturing system further satisfies:

$0.2 \leq EBL/BL \leq 1$;

where EBL is a horizontal distance in parallel with the optical axis between a coordinate point at the height of ½ HEP on the image-side surface of the fifth lens and image surface; BL is a horizontal distance in parallel with the optical axis between the point on the image-side surface of the fifth lens where the optical axis passes through and the image plane.

8. The optical image capturing system of claim 1, further comprising an aperture, wherein the optical image capturing system further satisfies:

$0.2 \leq InS/HOS \leq 1.1$; and $0.5 \leq HOS/HOI \leq 2.5$;

where HOI is a maximum height for image formation perpendicular to the optical axis on the image plane; InS is a distance in parallel with the optical axis between the aperture and the image plane.

9. An optical image capturing system, in order along an optical axis from an object side to an image side, comprising:
   a first lens having positive refractive power;
   a second lens having refractive power;
   a third lens having refractive power;
   a fourth lens having positive refractive power;
   a fifth lens having refractive power; and
   an image plane;
   wherein the optical image capturing system consists of the five lenses with refractive power; at least a surface of each of at least two lenses among the first to the third lenses has at least an inflection point; at least one lens of the second to the third lenses has positive refractive power; the fifth lens has an object-side surface, which faces the object side, and an image-side surface, which faces the image side, and both the object-side surface and the image-side surface of the fifth lens are aspheric surfaces;
   wherein the optical image capturing system satisfies:

$1.2 \leq f/HEP \leq 6.0$;

$0.5 \leq HOS/f \leq 3.0$; and $0.2 \leq EIN/ETL < 1$;

where f1, f2, f3, f4, and f5 are focal lengths of the first lens to the fifth lens, respectively; f is a focal length of the optical image capturing system; HEP is an entrance pupil diameter of the optical image capturing system; HOS is a distance in parallel with the optical axis between a point an object-side surface, which face the object side, of the first lens where the optical axis passes through and a point on the image plane where the optical axis passes through; ETL is a distance in parallel with the optical axis between a coordinate point at a height of ½ HEP on the object-side surface of the first lens and the image plane; EIN is a distance in parallel with the optical axis between the coordinate point at the height of ½ HEP on the object-side surface of the first lens and a coordinate point at a height of ½ HEP on the image-side surface of the fifth lens;

wherein the optical image capturing system further satisfies:

$MTFQ0 \geq 0.2$;

$MTFQ3 \geq 0.05$; and $MTFQ7 \geq 0.05$;

where HOI is a maximum height for image formation perpendicular to the optical axis on the image plane; MTFQ0, MTFQ3, and MTFQ7 are respectively values of modulation transfer function in a quarter of the spatial frequency at the optical axis, 0.3 HOI, and 0.7 HOI on an image plane.

10. The optical image capturing system of claim 9, wherein the optical image capturing system further satisfies:

$0 < ED45/IN45 \leq 50$;

where ED45 is a horizontal distance between the fourth lens and the fifth lens at the height of ½ HEP; IN45 is a horizontal distance between the fourth lens and the fifth lens on the optical axis.

11. The optical image capturing system of claim 9, wherein the optical image capturing system further satisfies:

$0 < ED12/IN12 \leq 10$;

where ED12 is a horizontal distance between the first lens and the second lens at the height of ½ HEP; IN12 is a horizontal distance between the first lens and the second lens on the optical axis.

12. The optical image capturing system of claim 9, wherein the optical image capturing system further satisfies:

$0 < ETP2/TP2 \leq 3$;

where ETP2 is a thickness of the second lens at the height of ½ HEP in parallel with the optical axis; TP2 is a thickness of the second lens on the optical axis.

13. The optical image capturing system of claim 9, wherein the optical image capturing system further satisfies:

$0 < ETP4/TP4 \leq 3$;

where ETP4 is a thickness of the fourth lens at the height of ½ HEP in parallel with the optical axis; TP4 is a thickness of the fourth lens on the optical axis.

14. The optical image capturing system of claim 9, wherein the optical image capturing system further satisfies:

$0 < ETP5/TP5 \leq 5$;

where ETP5 is a thickness of the fifth lens at the height of ½ HEP in parallel with the optical axis; TP5 is a thickness of the fifth lens on the optical axis.

15. The optical image capturing system of claim 9, wherein the optical image capturing system further satisfies:

$0 < IN12/f \leq 0.8$;

where IN12 is a distance on the optical axis between the first lens and the second lens.

16. The optical image capturing system of claim 9, wherein the optical image capturing system further satisfies:

$0\ mm < HOS \leq 20\ mm$.

17. The optical image capturing system of claim 9, wherein the optical image capturing system further satisfies:

$0.001 \leq |f/f1| \leq 1.5$;

$0.01 \leq |f/f2| \leq 3$;

$0.01 \leq |f/f3| \leq 3$;

$0.01 \leq |f/f4| \leq 5$; and $0.1 \leq |f/f5| \leq 5$

18. An optical image capturing system, in order along an optical axis from an object side to an image side, comprising:
   a first lens having positive refractive power;
   a second lens having refractive power;
   a third lens having refractive power;
   a fourth lens having positive refractive power, wherein at least one surface thereof has at least an inflection point thereon;
   a fifth lens having negative refractive power, wherein at least one surface thereof has at least an inflection point thereon; and
   an image plane;
   wherein the optical image capturing system consists of the five lenses having refractive power;
   at least one lens among the first lens to the third lens has at least an inflection point thereon;
   wherein the optical image capturing system satisfies:

$1.2 \leq f/HEP \leq 3.0$;

$0.5 \leq HOS/f \leq 2.5$;

$0.4 \leq |\tan(HAF)| \leq 3.0$; and $0.2 \leq EIN/ETL < 1$;

where f1, f2 f3, f4, and f5 are focal lengths of the first lens to the fifth lens, respectively; f is a focal length of the optical image capturing system; HEP is an entrance pupil diameter of the optical image capturing system; HAF is a half of a view angle of the optical image capturing system; HOS is a distance in parallel with the optical axis between a point on an object-side surface, which face the object side, of the first lens where the optical axis passes through and a point on the image plane where the optical axis passes through; ETL is a distance in parallel with the optical axis between a coordinate point at a height of ½ HEP on the object-side surface of the first lens and the image plane; EIN is a distance in parallel with the optical axis between the coordinate point at the height of ½ HEP on the object-side surface of the first lens and a coordinate point at a height of ½ HEP on the image-side surface of the fifth lens;
   wherein the optical image capturing system further satisfies:

$0.5 \leq HOS/HOI \leq 2.5$;

where HOI is a maximum height for image formation perpendicular to the optical axis on the image plane.

19. The optical image capturing system of claim 18, wherein the optical image capturing system further satisfies:

$0.2 \leq EBL/BL < 1$;

where EBL is a horizontal distance in parallel with the optical axis between a coordinate point at the height of ½ HEP on the image-side surface of the fifth lens and image surface; BL is a horizontal distance in parallel with the optical axis between the point on the image-side surface of the fifth lens where the optical axis passes through and the image plane.

20. The optical image capturing system of claim 19, wherein the optical image capturing system further satisfies:

$0 < ED45/IN45 \leq 50$;

where ED45 is a horizontal distance between the fourth lens and the fifth lens at the height of ½ HEP; IN45 is a horizontal distance between the fourth lens and the fifth lens on the optical axis.

21. The optical image capturing system of claim 18, wherein the optical image capturing system further satisfies:

$0 < IN45/f \leq 0.8$;

where IN45 is a horizontal distance between the fourth lens and the fifth lens on the optical axis.

22. The optical image capturing system of claim 18, further comprising an aperture, an image sensor, and a driving module, wherein the image sensor is disposed on the image plane, and is at least 0.3 megapixels; the driving module is coupled with the lenses to move the lenses;
   the optical image capturing system further satisfies:

$0.2 \leq InS/HOS \leq 1.1$;

where InS is a distance in parallel with the optical axis between the aperture and the image plane.

* * * * *